US012262361B2

(12) United States Patent
Kim et al.

(10) Patent No.: US 12,262,361 B2
(45) Date of Patent: Mar. 25, 2025

(54) METHOD AND APPARATUS FOR TRANSMITTING AND RECEIVING PHYSICAL-LAYER CHANNEL IN CONSIDERATION OF PRIORITY IN WIRELESS COMMUNICATION SYSTEM

(71) Applicant: Samsung Electronics Co., Ltd, Suwon-si (KR)

(72) Inventors: Taehyoung Kim, Suwon-si (KR); Jinkyu Kang, Suwon-si (KR); Youngbum Kim, Suwon-si (KR); Seunghoon Choi, Suwon-si (KR); Sungjin Park, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/515,029

(22) Filed: Nov. 20, 2023

(65) Prior Publication Data

US 2024/0098723 A1 Mar. 21, 2024

Related U.S. Application Data

(63) Continuation of application No. 16/578,213, filed on Sep. 20, 2019, now Pat. No. 11,825,456.

(30) Foreign Application Priority Data

Sep. 21, 2018 (KR) .................. 10-2018-0113654

(51) Int. Cl.
*H04W 72/0453* (2023.01)
*H04L 1/00* (2006.01)
(Continued)

(52) U.S. Cl.
CPC ........ *H04W 72/0453* (2013.01); *H04L 1/003* (2013.01); *H04L 5/0092* (2013.01);
(Continued)

(58) Field of Classification Search
None
See application file for complete search history.

(56) References Cited

U.S. PATENT DOCUMENTS 11,239,939 B2 * 2/2022 Papasakellariou ........................ H04L 27/26025
11,652,568 B2 * 5/2023 Papasakellariou .... H04L 5/0053 370/329

(Continued)

FOREIGN PATENT DOCUMENTS

CN 107925500 A 4/2018
CN 108093480 A 5/2018
(Continued)

OTHER PUBLICATIONS

U.S. Appl. No. 62/670,583 Provisional Application (May 11, 2018) (Year: 2018).*

(Continued)

*Primary Examiner* — Andre Tacdiran

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are a method and an apparatus for transmitting and receiving a physical-layer channel in consideration of a priority in a wireless communication system.

16 Claims, 14 Drawing Sheets

(51) Int. Cl.
| | |
|---|---|
| *H04L 5/00* | (2006.01) |
| *H04W 24/08* | (2009.01) |
| *H04W 72/23* | (2023.01) |
| *H04W 72/566* | (2023.01) |
| *H04W 76/11* | (2018.01) |
| *H04W 76/27* | (2018.01) |
| *H04W 80/02* | (2009.01) |

(52) U.S. Cl.
CPC ........... *H04W 24/08* (2013.01); *H04W 72/23* (2023.01); *H04W 72/569* (2023.01); *H04W 76/11* (2018.02); *H04W 76/27* (2018.02); *H04W 80/02* (2013.01)

(56) References Cited

U.S. PATENT DOCUMENTS

| | | |
|---|---|---|
| 2017/0208568 A1 | 7/2017 | Nam |
| 2018/0206247 A1 | 7/2018 | Sun |
| 2018/0213389 A1 | 7/2018 | Won et al. |
| 2018/0262313 A1 | 9/2018 | Nam et al. |
| 2018/0376511 A1 | 12/2018 | Tsai |
| 2019/0150124 A1 | 5/2019 | Nogami |
| 2019/0150142 A1 | 5/2019 | Huang |
| 2019/0158205 A1 | 5/2019 | Sheng |
| 2019/0222284 A1 | 7/2019 | Huang |
| 2019/0223164 A1 | 7/2019 | He |
| 2019/0274032 A1* | 9/2019 | Chatterjee ............... H04L 5/00 |
| 2019/0297637 A1 | 9/2019 | Liou |
| 2019/0306841 A1* | 10/2019 | Huang ............... H04L 5/0055 |
| 2019/0306924 A1 | 10/2019 | Zhang |
| 2019/0394758 A1 | 12/2019 | Cheng |
| 2020/0045569 A1 | 2/2020 | Seo |
| 2020/0154467 A1 | 5/2020 | Gong |
| 2020/0163062 A1 | 5/2020 | Takeda |
| 2020/0221428 A1 | 7/2020 | Moon |
| 2020/0229185 A1 | 7/2020 | Zhang et al. |
| 2020/0344762 A1 | 10/2020 | Takeda |
| 2020/0358581 A1 | 11/2020 | Takeda |
| 2021/0050936 A1 | 2/2021 | Seo |
| 2021/0051692 A1 | 2/2021 | Chen |
| 2021/0067268 A1 | 3/2021 | Seo |
| 2021/0084623 A1 | 3/2021 | Zhang |
| 2021/0160035 A1* | 5/2021 | Kittichokechai ..... H04W 72/23 |
| 2021/0168779 A1 | 6/2021 | Mondal |
| 2021/0297135 A1 | 9/2021 | Kim |
| 2021/0307051 A1 | 9/2021 | Chatterjee |
| 2021/0314053 A1 | 10/2021 | Matsumura |
| 2021/0314885 A1* | 10/2021 | Kwak ............... H04L 5/0051 |
| 2021/0314927 A1 | 10/2021 | Noh |
| 2021/0351975 A1 | 11/2021 | Matsumura |
| 2021/0378026 A1 | 12/2021 | Ohara |

FOREIGN PATENT DOCUMENTS

| | | |
|---|---|---|
| CN | 108199819 A | 6/2018 |
| CN | 108496319 A | 9/2018 |
| KR | 10209390 B1 | 3/2020 |
| WO | 2018128439 A1 | 7/2018 |
| WO | 2018132672 A1 | 7/2018 |

OTHER PUBLICATIONS

U.S. Appl. No. 62/673,739 Provisional Application(May 18, 2018) (Year: 2018).*
U.S. Appl. No. 62/710,411 Provisional Application (Feb. 16, 2018) (Year: 2018).*
ISA/KR, International Search Report and Written Opinion of the International Searching Authority, International Application No. PCT/KR2019/012235, Dec. 26, 2019, 8 pages.
Ericsson, "On simultaneous reception of physical and reference signals across CCs," R1-1804977, 3GPP TSG RAN WG1 Meeting #92bis, Sanya, China, Apr. 16-20, 2018, 10 pages.
Ericsson, "Maintenance for Downlink signals and channels," R1-1809700 (R1-1809256), 3GPP TSG-RAN WG1 Meeting#94, Gothenburg, Sweden, Aug. 20-24, 2018, 5 pages.
LG Electronics, "Remaining issues on downlink control channel," R1-1808490, 3GPP TSG RAN WG1 Meeting #94, Gothenburg, Sweden, Aug. 20-24, 2018, 9 pages.
NTT Docomo, Inc., "Offline summary for PDCCH structure and search space," R1-1809766, 3GPP TSG RAN WG1 Meeting #94, Gothenburg, Sweden, Aug. 20-24, 2018, 64 pages.
Decision of Rejection dated Jan. 25, 2023 in connection with Korean Patent Application No. 10-2018-0113654, 5 pages.
Office Action dated Sep. 26, 2023, in connection with counterpart Chinese Application No. 201980061291.6, 22 pages.
NTT Docomo, Inc., "Views on control resource set configuration for NR-PDCCH," 3GPP TSG RAN WG1 NR Ad-Hoc#2 R1-1711090, Qingdao, P.R. China, Jun. 2017, 3 pages.
Notice of Allowance issued Apr. 23, 2024, in connection with Chinese Patent Application No. 201980061291.6, 8 pages.
Supplementary European Search Report dated Apr. 10, 2024, in connection with European Patent Application No. 23208260.2, 12 pages.
CMCC, "Discussion on DCI format design", 3GPP TSG RAN WG1 Meeting #92, R1-1802042, Athens, Greece, Feb. 26-Mar. 2, 2018, 7 pages.
CMCC, "Discussion on Remaining Issue for DCI", 3GPP TSG-RAN WG1 #92bis, R1-1804099, Sanya, China, Apr. 2018, 7 pages.
NTT Docomo, Inc., "Offline summary for PDCCH structure and search space," 3GPP TSG RAN WG1 Meeting #94 R1-1809855, Gothenburg, Sweden, Aug. 2018, 70 pages.
VIVO, "Handling of PDCCH on rate matching resource," 3GPP TSG RAN WG1 Meeting #92bis, R1-1804267, Sanya, China, Apr. 2018, 3 pages.

* cited by examiner

METHOD AND APPARATUS FOR TRANSMITTING AND RECEIVING PHYSICAL-LAYER CHANNEL IN CONSIDERATION OF PRIORITY IN WIRELESS COMMUNICATION SYSTEM

CROSS-REFERENCE TO RELATED APPLICATION

This application is a continuation of application Ser. No. 16/578,213 filed Sep. 20, 2019, now Pat. No. 11,825,456 issued Nov. 21, 2023, which is based on and claims priority under 35 U.S.C. 119 to Korean Patent Application No. 10-2018-0113654 filed on Sep. 21, 2018, in the Korean Intellectual Property Office, the disclosure of which is herein incorporated by reference in its entirety.

BACKGROUND

1. Field

The disclosure relates to a method and an apparatus for transmitting and receiving physical-layer channels having different priorities in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

A 5G communication system should be freely capable of responding to various requirements of users and service providers and thus support services that simultaneously satisfy the various requirements. Services which are considered for the 5G communication system include enhanced mobile broadband (eMBB), massive machine-type communication (mMTC), and ultra-reliable low-latency communication (URLLC). Since the URLLC requires a very low delay time, it may be very important to perform transmission and reception with a higher priority than other services, for example, services corresponding to the eMBB or the mMTC.

Embodiments of the disclosure propose various methods of transmitting and receiving uplink and downlink physical-layer channels through a service having a relatively high priority such as the URLLC in preference to other services. Embodiments of the disclosure include a method of preferentially monitoring a physical downlink control channel (PDDCH) for URLLC, a method of applying a configuration related to a beam to the PDCCH for URLLC, a method of arranging the DCI size in consideration of the size of a downlink control information (DCI) format, a method of changing a bandwidth part in consideration of URLLC, and a method of performing transmission based on non-approval of URLLC.

In an accordance with an aspect of the disclosure, a method by a terminal is provided. The method comprises receiving a control message including configuration information of a first control resource set (CORESET) and configuration information of a second CORESET, determining whether a first monitoring occasion of the first CORESET and a second monitoring occasion of the second CORESET overlap each other and in case that the first monitoring occasion overlaps the second monitoring occasion, monitoring a physical downlink control channel (PDCCH) in a CORESET corresponding to a first control resource among the first CORESET and the second CORESET.

In an accordance with another aspect of the disclosure, a method by a base station is provided. The method comprises, transmitting a control message including configuration information of a first control resource set (CORESET) and configuration information of a second CORESET, and transmitting search space configuration information comprising a CORESET index, a search space type, and radio network temporary identifier (RNTI) information. Wherein, in case that a first monitoring occasion of the first CORESET overlaps a second monitoring occasion of the second CORESET, monitoring a physical downlink control channel (PDCCH) in a CORESET corresponding to a first control resource among the first CORESET and the second CORESET.

In an accordance with another aspect of the disclosure, a terminal is provided. The terminal comprises a transceiver and a controller coupled with the transceiver and configured to receive a control message including configuration information of a first control resource set (CORESET) and configuration information of a second CORESET, to determine whether a first monitoring occasion of the first CORESET and a second monitoring occasion of the second CORESET overlap each other, and in case that the first monitoring occasion overlaps the second monitoring occasion, to monitor a physical downlink control channel (PDCCH) in a CORESET corresponding to a first control resource among the first CORESET and the second CORESET.

In an accordance with another aspect of the disclosure, a base station is provided. The base station comprises a transceiver and a controller coupled with the transceiver and configured to transmit a control message including configuration information of a first control resource set (CORESET) and configuration information of a second CORESET, and to transmit search space configuration information including a CORESET index, a search space type, and radio network temporary identifier (RNTI) information. Wherein, in case that the first monitoring occasion of the first CORESET overlaps the second monitoring occasion of the second CORESET, monitoring a physical downlink control channel (PDCCH) in a CORESET corresponding to a first control resource among the first CORESET and the second CORESET.

According to an embodiment of the disclosure, it is possible to provide a method and an apparatus for transmitting and receiving physical-layer channels having different priorities in a wireless communication system.

Through a method of transmitting and receiving physical-layer channels in consideration of priorities thereof proposed by embodiments of the disclosure, the delay time of a service having strict delay time requirements can be significantly reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
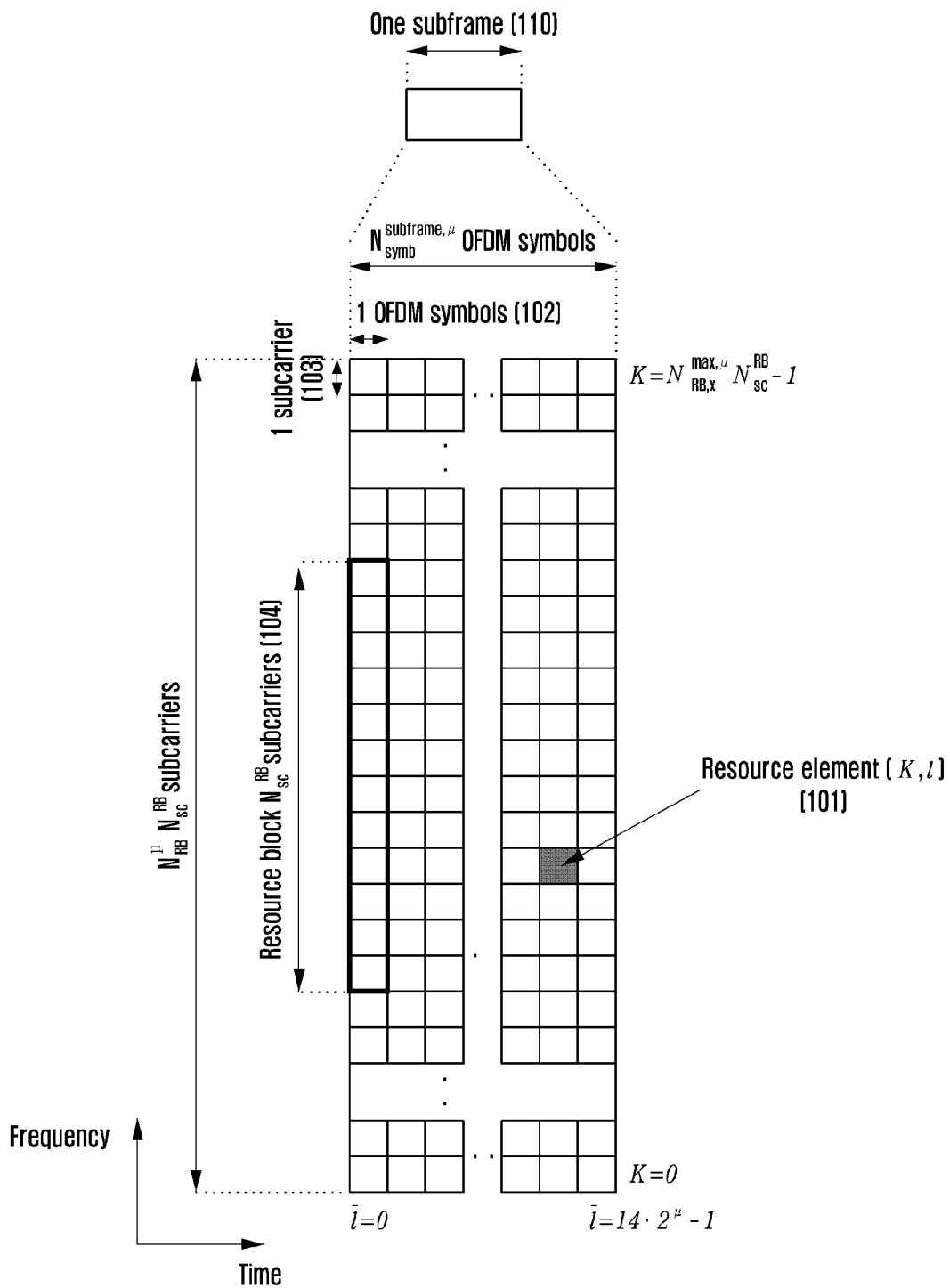
FIG. 1 illustrates the basic structure of a time-frequency domain in 5G according to an embodiment of the disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. Hereinafter, although the 5G system is described as an example of the disclosure, embodiments of the disclosure can be applied to other communication systems having the similar backgrounds or channel from. For example, the communication systems may include mobile communication technology developed after LTE or LTE-A and 5G. Also, embodiments of the disclosure may be modified without departing from the scope of the disclosure, and may be applied to other communication systems, based on the determination by those skilled in the art.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

Hereinafter, a gNB is the entity that allocates resources to a UE, and may be at least one of a gNode B, an eNode B, a Node B, a base station (BS), a radio access unit, a gNB controller, and a node on a network. A terminal may include a user equipment (UE), a mobile station (MS), a cellular phone, a smart phone, a computer, or a multimedia system capable of performing a communication function. Of course, the disclosure is not limited thereto. Hereinafter, an embodiment of the disclosure is described on the basis of an NR or LTE/LTE-A system by way of example, but may be applied to other communication systems having similar technical backgrounds or channel forms. Also, an embodiment of the disclosure may be modified without departing from the scope of the disclosure, and may be applied to other communication systems based on a determination by those skilled in the art.

For convenience of description, the disclosure may use terms and names defined in the $3^{rd}$-generation partnership project long-term evolution (3GPP LTE) standard. However, the disclosure is not limited to the terms and names, and may be equally applied to a system according to another standard.

In an embodiment of the disclosure, transmission and reception of a channel may mean transmission and/or reception of signals, information, or data in the corresponding channel or through the corresponding channel.

In an embodiment of the disclosure, control resource may mean control resource set (CORESET) or control region or control resource region.

A wireless communication system has evolved into a broadband wireless communication system that provides high-speed and high-quality packet data service, like communication standards such as high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of IEEE, or the like, beyond the initially provided voice-based service.

An LTE system, which is a representative example of the broadband wireless communication system, employs an orthogonal frequency-division multiplexing (OFDM) scheme for a downlink (DL), and employs a single-carrier frequency-division multiple-access (SC-FDMA) scheme for an uplink (UL). The uplink is a radio link through which a terminal (user equipment (UE) or a mobile station (MS)) transmits data or a control signal to a gNB (eNode B or base station (BS)), and the downlink is a radio link through which the base station transmits data or a control signal to the terminal. In the multiple access schemes described above, time-frequency resources for carrying data or control information are allocated and operated in a manner that prevents overlapping of the resources, i.e. to establish the orthogonality, between users, so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine-type communication (mMTC), and ultra-reliable low-latency communication (URLLC).

The eMBB aims to provide a data transmission rate which is improved so as to surpass the data transmission speed supported by LTE, LTE-A, or LTE-Pro. For example, in the 5G communication system, the eMBB should provide a peak downlink data rate of 20 Gbps and a peak uplink data rate of 10 Gbps from the viewpoint of one base station. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 20 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the Internet of Things (IoT), mMTC is under consideration for implementation in the 5G communication system. The mMTC is required to support access of large numbers of terminals within a cell, improve coverage of the terminal, increase a battery lifetime, and reduce the costs of the terminal in order to efficiently provide IoT. IoT is attached to various sensors and devices to provide communication, and thus should support a large number of terminals (for example, 1,000,000 terminals/km$^2$) within the cell. Further, since the terminal supporting mMTC is highly likely to be located in a shade area, such as a basement, which a cell cannot cover due to service characteristics, the mMTC requires wider coverage than other services provided by the 5G communication system. The terminal supporting the mMTC needs to be produced at low cost, and it is difficult to frequently exchange a battery thereof, so that a very long battery lifetime, for example, 10 to 15 years, is required.

Finally, URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds, and also must meet requirements of a packet error rate equal to or smaller than $10^{-5}$. Accordingly, for services supporting the URLLC, the 5G system should provide a transmit time interval (TTI) smaller than that of other systems and also has design strategy of allocating wide resources in a frequency band in order to guarantee the reliability of a communication link.

Three services of 5G, namely eMBB, URLLC, and mMTC, may be multiplexed and transmitted in one system. At this time, in order to meet the different requirements of respective services, the services may use different transmission/reception schemes and transmission/reception parameters.

Hereinafter, the frame structure of the 5G system will be described in more detail with reference to the drawings.

FIG. 1 illustrates the basic structure of a time-frequency domain, which is a radio resource domain in which data or a control channel is transmitted in the 5G system according to an embodiment of the disclosure.

In FIG. 1, the horizontal axis indicates a time domain and the vertical axis indicates a frequency domain. A basic unit of resources in the time and frequency domain is a resource element (RE) 101, and may be defined as one orthogonal frequency-division multiplexing (OFDM) symbol 102 on the time axis and one subcarrier 103 on the frequency axis. In the frequency domain, $N_{sc}^{RB}$ (for example, 12) successive REs may correspond to one resource block (RB) 104. n symbols 102 may correspond to one subframe 110, and the subframe length may be 1.0 ms. The number of symbols included in one subframe 110 may vary depending on the subcarrier spacing.

Figure 2:
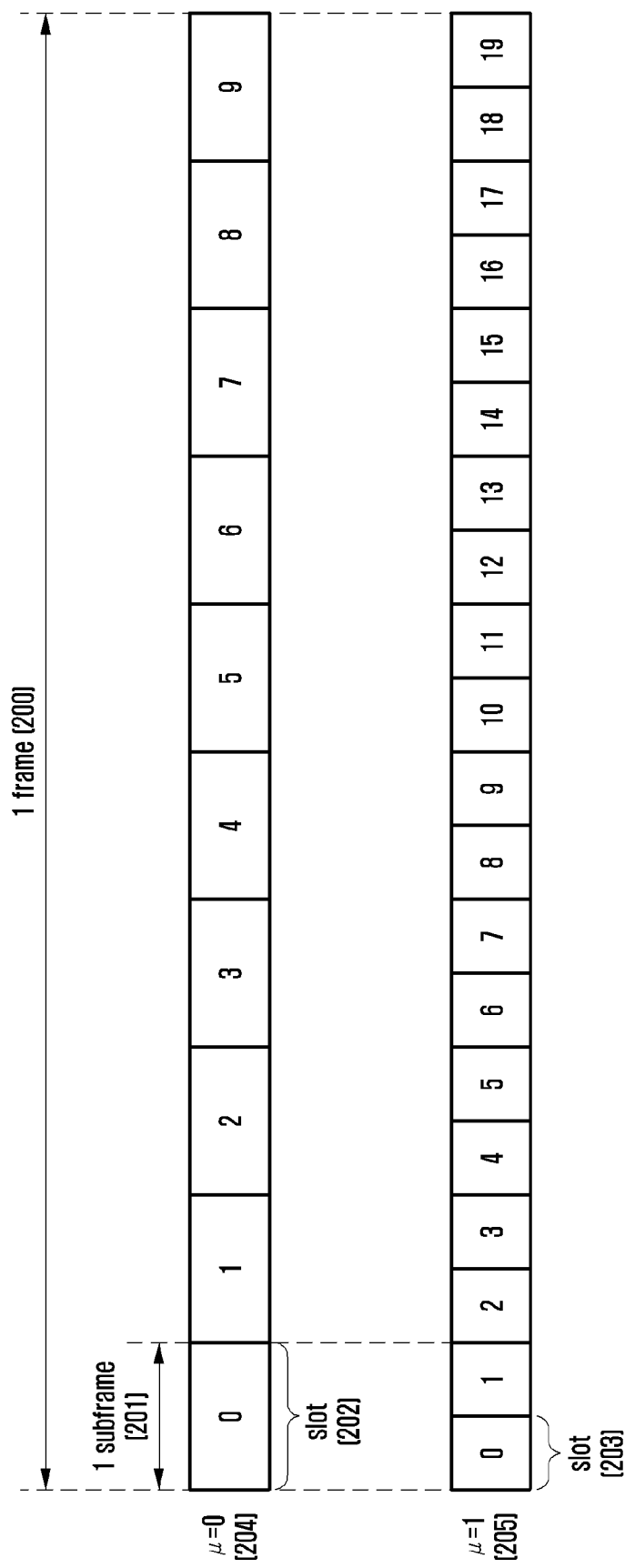
FIG. 2 illustrates a frame, a subframe, and a slot structure in 5G according to an embodiment of the disclosure.

FIG. 2 illustrates the slot structure under consideration for adoption in the 5G system according to an embodiment of the disclosure.

In FIG. 2, an example of the structure of a frame 200, a subframe 201, and a slot 202 is illustrated. One frame 200 may be defined as 10 ms. One subframe 201 may be defined as 1 ms, and accordingly one frame 200 may consist of a total of 10 subframes 201. One slot 202 or 203 may be defined as 14 OFDM symbols (that is, the number of symbols $N_{symb}^{slot}$) per slot=14). One subframe 201 may consist of one or a plurality of slots 202 and 203, and the numbers of slots 202 and 203 per subframe 201 may be different according to set values μ 204 and 205 for subcarrier spacing. In the example of FIG. 2, the subcarrier spacing set values μ=0 204 and μ=1 205. In the case of μ=0 204, one subframe 201 may consist of one slot 202. In the case of μ=1 205, one subframe 201 may consist of two slots 203. That is, the number of slots ($N_{slot}^{subframe,\mu}$) per subframe may be different according to the set value μ for subcarrier spacing, and accordingly, the number of slots ($N_{slot}^{frame,\mu}$) per frame may be different. $N_{slot}^{subframe,\mu}$ and $N_{slot}^{frame,\mu}$ according to the subcarrier spacing set values μ may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, the configuration of a bandwidth part (BWP) in the 5G communication system will be described in detail with reference to the drawings.

Figure 3:
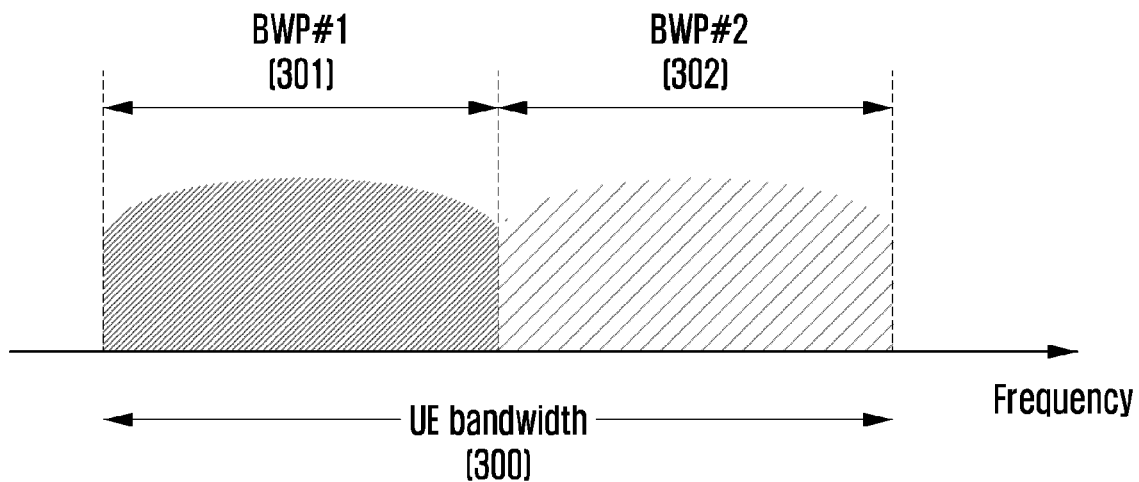
FIG. 3 illustrates an example of the configuration of a bandwidth part in 5G according to an embodiment of the disclosure.

FIG. 3 illustrates an example of the configuration of the bandwidth part in the 5G communication system according to an embodiment of the disclosure.

In FIG. 3, a terminal bandwidth 300 is configured as two bandwidth parts, that is, bandwidth part #1 301 and bandwidth part #2 302. The gNB may configure one or a plurality of bandwidth parts in the terminal, and may configure the following information on each bandwidth part.

TABLE 2

| BWP ::= | SEQUENCE { |
|---|---|
| bwp-Id | BWP-Id, |
| (bandwidth part ID) | |
| locationAndBandwidth | INTEGER (1..65536), |
| (bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (cyclic prefix) | |
| } | |

Not only the configuration information but also various parameters associated with the bandwidth part may be configured in the terminal. The information may be transmitted from the gNB to the terminal through higher-layer signaling, for example, radio resource control (RRC) signaling. Among the one or a plurality of configured bandwidth parts, at least one bandwidth part may be activated. Information indicating whether to activate the configured bandwidth parts may be semi-statically transferred from the gNB to the terminal through RRC signaling, or may be dynamically transferred through DCI.

The terminal before the RRC connection may receive the configuration of an initial bandwidth part (initial BWP) for initial access from the gNB through a master information block (MIB. More specifically, the terminal may receive configuration information for a control resource set (CORE-SET) and a search space in which a PDCCH for receiving system information (remaining system information: RMSI or system information block 1: SIB1) required for initial access through the MIB can be transmitted in an initial access step. The control resource set and the search space configured as the MIB may be considered as an identity (ID) and 0, respectively. The gNB may inform the terminal of configuration information such as frequency allocation information for control resource set #0, time allocation information, and numerology through the MIB. Further, the gNB may inform the terminal of configuration information for a monitoring period and occasion of control resource set #0, that is, configuration information for search space #0, through the MIB. The terminal may consider a frequency region configured as control resource set #0 acquired from the MIB as an initial bandwidth part for initial access. At this time, the ID of the initial bandwidth part may be 0.

The configuration of the bandwidth part supported by 5G may be used for various purposes.

For example, the case in which the bandwidth supported by the terminal is smaller than the system bandwidth may be supported through the configuration of the bandwidth part. For example, as the frequency location (configuration information 2) of the bandwidth part is configured in the terminal, the terminal may transmit and receive data at a specific frequency location within the system bandwidth.

In another example, the gNB may configure a plurality of bandwidth parts in the terminal for the purpose of supporting different numerologies. For example, in order to support the terminal to perform data transmission and reception using both subcarrier spacing of 15 kHz and subcarrier spacing of 30 kHz, two bandwidth parts may be configured as subcarrier spacings of 15 kHz and 30 kHz, respectively. Different bandwidth parts may be frequency-division-multiplexed, and when data is transmitted/received at particular subcarrier spacing, the bandwidth part configured as the corresponding subcarrier spacing may be activated.

In another example, the base station may configure bandwidth parts having different size bandwidths in the terminal for the purpose of reducing the power consumption of the terminal. For example, if the terminal supports a very large bandwidth, for example, a bandwidth of 100 MHz, and always transmits and receives data through the corresponding bandwidth, very high power consumption may result. Particularly, monitoring an unnecessary downlink control channel through a large bandwidth of 100 MHz in the state in which there is no traffic is inefficient from the aspect of power consumption. In order to reduce power consumption of the terminal, the gNB may configure a relatively narrow bandwidth part of the bandwidth, for example, a bandwidth part of 20 MHz. The terminal may perform a monitoring operation in the bandwidth part of 20 MHz in the state in which there is no traffic, and if data is generated, may transmit and receive data through the bandwidth part of 100 MHz according to an instruction from the gNB.

In a method of configuring the bandwidth part, terminals before the RRC connection may receive configuration information for an initial bandwidth part through a master information block (MIB) in an initial access step. More specifically, the terminal may receive the configuration of a control resource set (CORESET) for a downlink control channel in which downlink control information (DCI) for scheduling a system information block (SIB) can be transmitted from an MIB of a physical broadcast channel (PBCH. The bandwidth of the control resource set configured as the MIB may be considered as an initial bandwidth part, and the terminal may receive a physical downlink shared channel (PDSCH), in which the SIB is transmitted, through the configured initial bandwidth part. The initial bandwidth part may be used not only for receiving the SIB but also other system information (OSI), paging, or random access.

Subsequently, downlink control information (DCI) in the 5G system will be described in detail.

In the 5G system, scheduling information for uplink data (or a physical uplink data channel (physical uplink shared channel (PUSCH)) or downlink data (or physical downlink data channel (physical downlink shared channel (PDSCH)) may be transmitted from the gNB to the terminal through DCI. The terminal may monitor a fallback DCI format and a non-fallback DCI format for the PUSCH or the PDSCH. The fallback DCI format may include a fixed field predefined between the gNB and the terminal, and the non-fallback DCI format may include a configurable field.

The DCI may be transmitted through a physical downlink control channel (PDCCH) after passing through a channel coding and modulation process. A cyclic redundancy check (CRC) is added to a DCI message payload and is scrambled with a radio network temporary identifier (RNTI) corresponding to the identity of the terminal. Depending on the purpose of the DCI message, for example, UE-specific data transmission, a power control command, or a random access response, different RNTIs are used. That is, the RNTI is not explicitly transmitted, but is included in a CRC calculation process and thus transmitted. If the terminal receives the DCI message transmitted through the PDCCH, the terminal may identify the CRC through the allocated RNTI, and may recognize that the corresponding message is transmitted to the terminal if the CRC is determined to be correct on the basis of the CRC identification result.

For example, DCI for scheduling a PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI for providing notification of a slot format indicator (SFI) may be scrambled with an SFI-RNTI. DCI for providing notification of transmit power control (TPC) may be scrambled with a TPC-RNTI. DCI for scheduling a UE-specific PDSCH or PUSCH may be scrambled with a Cell RNTI (C-RNTI).

DCI format 0_0 may be used for fallback DCI for scheduling a PUSCH, in which case the CRC may be scrambled with a C-RNTI. DCI format 0_0, in which the CRC is scrambled with the C-RNTI, may include, for example, the following information.

TABLE 3

Identifier for DCI formats - [1] bit
Frequency-domain resource assignment -⌈$\log_2(N_{RB}^{UL, BWP}(N_{RB}^{UL, BWP} + 1)/2)$⌉ bits
Time-domain resource assignment - X bits
Frequency-hopping flag - 1 bit.
Modulation and coding scheme - 5 bits
New data indicator - 1 bit
Redundancy version - 2 bits
HARQ process number - 4 bits
TPC (transmit power control) command
for scheduled PUSCH - [2] bits
UL (uplink)/SUL (supplement uplink)
indicator - 0 or 1 bit DCI format 0_1 may be used for non-fallback DCI for scheduling a PUSCH, in which case the CRC may be scrambled with a C-RNTI. DCI format 0_1, in which the CRC is scrambled with the C-RNTI, may include, for example, the following information

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency-domain resource assignment
    For resource allocation type 0, ⌈$N_{RB}^{UL,BWP}/P$⌉ bits
    For resource allocation type 1, ⌈$\log_2(N_{RB}^{UL,BWP}(N_{RB}^{UL,BWP} + 1)/2)$⌉ bits
Time-domain resource assignment -1, 2, 3, or 4 bits
VRB (virtual resource block)-to-PRB (physical resource block) mapping - 0 or 1 bit, only for resource allocation type 1.
    0 bits if only resource allocation type 0 is configured;
    1 bit otherwise.
Frequency-hopping flag - 0 or 1 bit, only for resource allocation type 1.
    0 bits if only resource allocation type 0 is configured;
    1 bit otherwise.
Modulation and coding scheme - 5 bits
New data indicator - 1 bit
Redundancy version - 2 bits
HARQ process number - 4 bits
1 st downlink assignment index - 1 or 2 bits
    1 bit for semi-static HARQ-ACK codebook;
    2 bits for dynamic HARQ-ACK codebook with single
    HARQ-ACK codebook.
2nd downlink assignment index - 0 or 2 bits
    2 bits for dynamic HARQ-ACK codebook with two HARQ-ACK
    sub-codebooks;
    0 bits otherwise.
TPC command for scheduled PUSCH - 2 bits SRS resource - $\left\lceil \log_2\left(\sum_{k=1}^{L_{max}} \binom{N_{SRS}}{k}\right) \right\rceil$ or ⌈$\log_2(N_{SRS})$⌉ bits $\left\lceil \log_2\left(\sum_{k=1}^{L_{max}} \binom{N_{SRS}}{k}\right) \right\rceil$ bits for non-codebook-based PUSCH transmission;
⌈$\log_2(N_{SRS})$⌉ bits for codebook-based PUSCH transmission.
Precoding information and number of layers -up to 6 bits
Antenna ports - up to 5 bits
SRS request - 2 bits
CSI (channel state information) request - 0, 1, 2, 3, 4, 5, or 6 bits
CBG (code block group) transmission information - 0, 2, 4, 6, or 8 bits
PTRS (phase-tracking reference signal)-DMRS (demodulation reference signal) association - 0 or 2 bits.
beta offset indicator - 0 or 2 bits
DMRS sequence initialization - 0 or 1 bit DCI format 1_0 may be used for fallback DCI for scheduling a PDSCH in which case the CRC may be scrambled with a C-RNTI. DCI format 1_0 in which the CRC is scrambled with the C-RNTI may include, for example, the following information.

TABLE 5

Identifier for DCI formats - [1] bit
Frequency-domain resource assignment -⌈$\log_2(N_{RB}^{DL, BWP}(N_{RB}^{DL, BWP} + 1)/2)$⌉ bits
Time-domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH (physical uplink control channel)
resource indicator- 3 bits
PDSCH-to-HARQ feedback timing indicator - [3] bits DCI format 1_1 may be used for non-fallback DCI for scheduling a PUSCH, in which case the CRC may be scrambled with a C-RNTI. DCI format 1_1, in which the CRC is scrambled with the C-RNTI, may include, for example, the following information.

TABLE 6

Carrier indicator - 0 or 3 bits
Identifier for DCI formats - [1] bits
Bandwidth part indicator - 0, 1 or 2 bits
Frequency-domain resource assignment
For resource allocation type 0, $\lceil (N_{RB}^{DL,\ BWP}/P) \rceil$ bits
For resource allocation type 1, $\lceil \log_2 (N_{RB}^{DL,\ BWP}(N_{RB}^{DL,\ BWP} + 1)/2) \rceil$
Time-domain resource assignment - 1, 2, 3, or 4 bits
VRB-to-PRB mapping - 0 or 1 bit, only for resource allocation type 1.
0 bits if only resource allocation type 0 is configured;
1 bit otherwise.
PRB (physical resource block) bundling size indicator - 0 or 1 bit
Rate-matching indicator - 0, 1, or 2 bits
ZP CSI-RS trigger (zero-power channel-state-information reference signal trigger) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits TABLE 6-continued CBG flushing out information - 0 or 1 bit
DMRS sequence initialization - 1 bit Hereinafter, the downlink control channel in the 5G communication system will be described in more detail with reference to the drawings.

Figure 4:
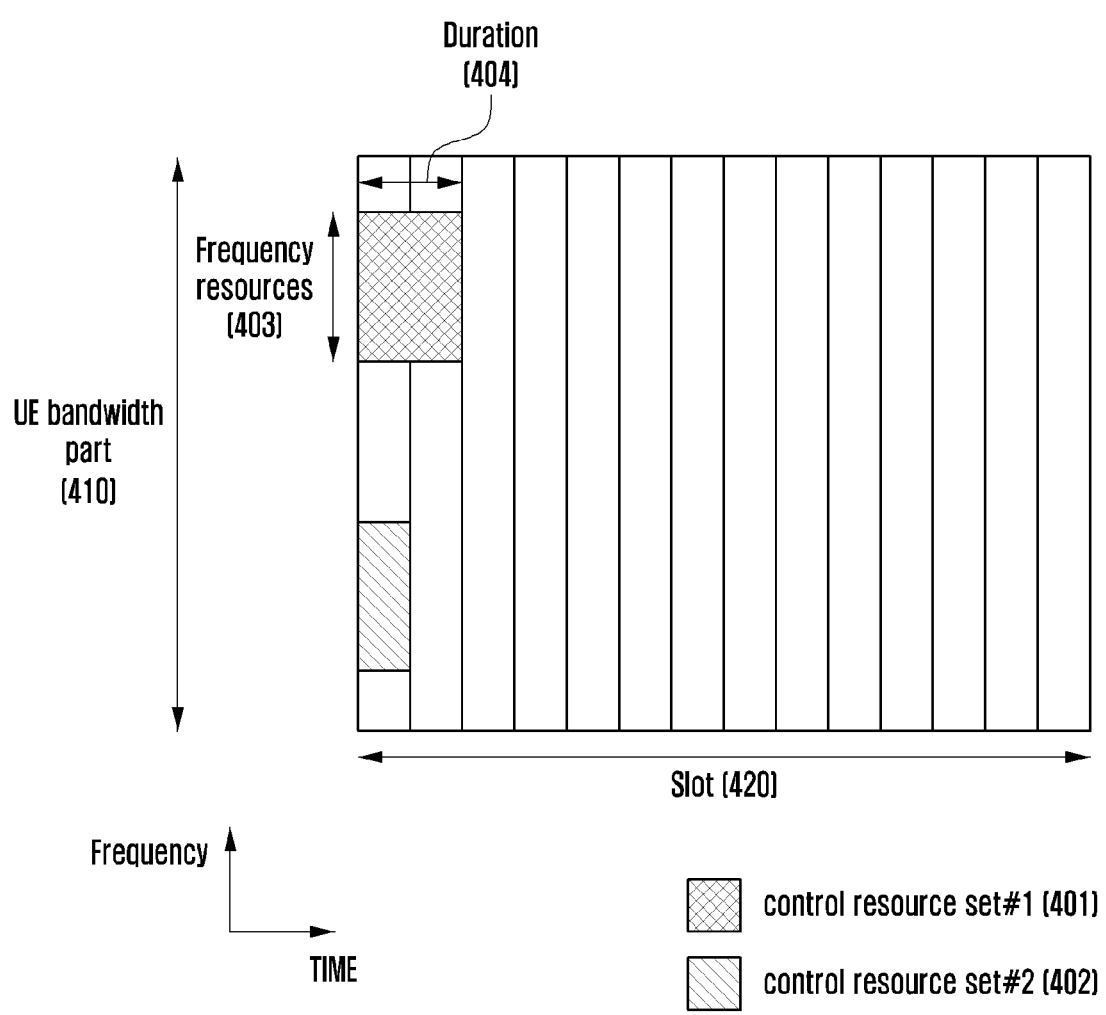
FIG. 4 illustrates an example of the configuration of a control resource set of a downlink control channel in 5G according to an embodiment of the disclosure.

FIG. 4 illustrates an example of a control resource set (CORESET) in which a downlink control channel is transmitted in the 5G wireless communication system according to an embodiment of the disclosure.

FIG. 4 illustrates an example in which a bandwidth part 410 of the terminal is configured on the frequency axis and two control resource sets (control resource set #1 401 and control resource set #2 402) are configured within one slot 420 on the time axis. The control resource sets 401 and 402 may be configured in specific frequency resources 403 within a total terminal bandwidth part 410 on the frequency axis. The control resource sets 401 and 402 may be configured as one or a plurality of OFDM symbols on the time axis, which may be defined as a control resource set duration 404. In the example of FIG. 4, control resource set #1 401 is configured as the control resource set duration of two symbols, and control resource set #2 402 is configured as the control resource set duration of one symbol.

The control resource sets in 5G may be configured through higher-layer signaling (for example, system information, a master information block (MIB), or radio resource control (RRC) signaling) in the terminal by the gNB. Configuring the control resource set in the terminal may mean providing information such as the identity of the control resource set, the frequency location of the control resource set, and the symbol length of the control resource set. For example, the following information may be included.

TABLE 7

```
ControlResourceSet ::=                                         SEQUENCE {
    -- Corresponds to L1 parameter 'CORESET-ID'
    controlResourceSetId
    ControlResourceSetId,
        (identity of control resource set)
    frequencyDomainResources                                   BIT STRING (SIZE
(45)),
        (information on resource allocation on frequency axis)
    duration                                                   INTEGER
(1..maxCoReSetDuration),
        (resource allocation information on time axis)
    cce-REG-MappingType
    CHOICE {
        (CCE-to-REG mapping type)
            interleaved
    SEQUENCE {
                    reg-BundleSize
    ENUMERATED {n2, n3, n6},
                (size of REG bundle)
                    precoderGranularity
    ENUMERATED {sameAsREG-bundle, allContiguousRBs},
                    interleaverSize
    ENUMERATED {n2, n3, n6}
                (size of interleaver)
                    shiftIndex
                INTEGER(0..maxNrofPhysicalResourceBlocks-1)
                            OPTIONAL
            (interleaver shift)
    },
    nonInterleaved                                             NULL
```

TABLE 7-continued

```
    },
    tci-StatesPDCCH
        SEQUENCE(SIZE (1..maxNrofTCI-StatesPDCCH)) OF TCI-StateId
            OPTIONAL,
        (QCL(Quasi Co-Location) configuration information)
        tci-PresentInDCI        ENUMERATED {enabled}
            OPTIONAL,  -- Need S
    }
```

In [Table 7] above, tci-StatesPDCCH (simply, referred to as a TCI state) configuration information may include information on one or a plurality of synchronization signal (SS)/physical broadcast channel (PBCH) block indexes or channel state information reference signal (CSI-RS) indexes having the quasi co-location (QCL) relationship with a demodulation reference signal (DMRS) transmitted in the corresponding control resource set. The information in [Table 7] above may be defined as CORESET configuration information.

Figure 5:
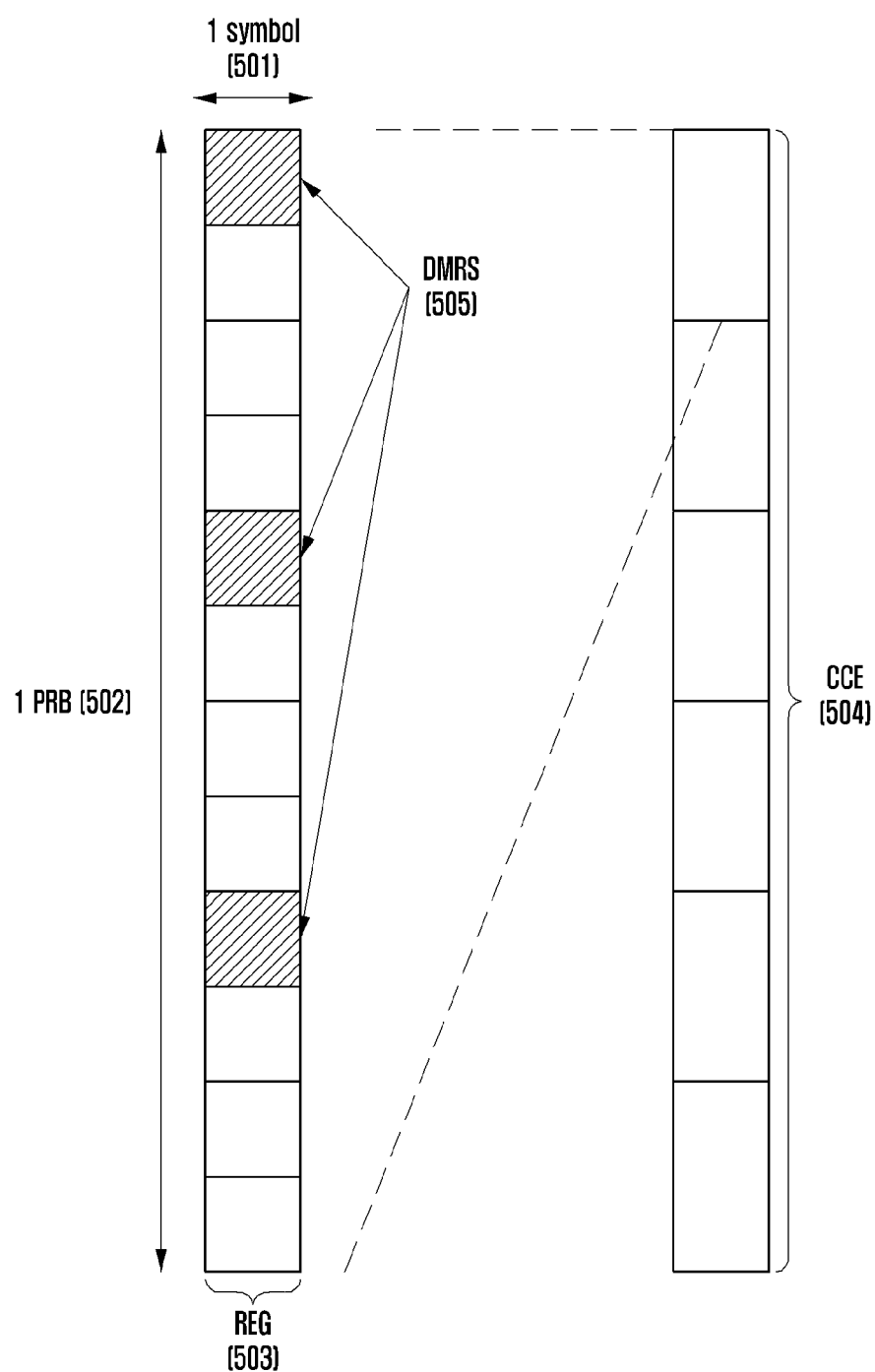
FIG. 5 illustrates the structure of a downlink control channel in 5G according to an embodiment of the disclosure.

FIG. 5 illustrates an example of a basic unit of time and frequency resources included in a downlink control channel which can be used by 5G according to an embodiment of the disclosure.

Referring to FIG. 5, the basic unit of time and frequency resources included in the control channel may be named a resource element group (REG) 503, and the REG 503 may be defined as one OFDM symbol 501 on the time axis and one physical resource block (PRB) 502 on the frequency axis, that is, as 12 subcarriers. It is possible to configure a downlink control channel allocation unit by concatenating the REG 503.

As illustrated in FIG. 5, if the basic unit in which the downlink control channel is allocated in the 5G system is a control channel element (CCE) 504, one CCE 504 may consist of a plurality of REGs 503. For example, the REG 503 in FIG. 5 may consist of 12 REs, and if one CCE 504 consists of six REGs 503, one CCE 504 may consist of 72 REs. If a downlink control resource set is configured, the corresponding resource set may include a plurality of CCEs 504, and a specific downlink control channel may be mapped to one or a plurality of CCEs 504 according to an aggregation level (AL) within the control resource set and may then be transmitted. The CCEs 504 within the control resource set may be distinguished by numbers, and the numbers may be assigned according to a logical mapping scheme.

The basic unit of the downlink control channel illustrated in FIG. 5, that is, the REG 503, may include all REs to which the DCI is mapped and the region to which a DMRS 505, which is a reference signal for decoding the REs, is mapped. As illustrated in FIG. 5, there DMRSs 505 may be transmitted within one REG 503.

The number of CCEs required to transmit the PDCCH may be 1, 2, 4, 8, or 16 according to the Aggregation Level (AL), and the different number of CCEs may be used to implement link adaptation of the downlink control channel. For example, if AL=L, one downlink control channel may be transmitted through L CCEs. The terminal is required to detect a signal in the state in which the terminal is not aware of information on the downlink control channel, and a search space indicating a set of CCEs may be used to assist in such blind decoding. The search space is a set of candidate control channels including CCEs for which the terminal should attempt decoding at the given aggregation level, and there are several aggregation levels at which a set of CCEs is configured by 1, 2, 4, 8, and 16 CCEs, so that the terminal has a plurality of search spaces. The search space set may be defined as a set of search spaces at all configured aggregation levels.

The search spaces may be classified into a common search space and a terminal (UE)-specific search space. Terminals in a predetermined group or all UEs may search for (monitor) a common search space of the PDCCH in order to receive cell-common control information such as dynamic scheduling of system information or paging messages. For example, PDSCH scheduling allocation information for transmission of an SIB including information on the service provider of a cell may be received by searching a common search space of the PDCCH. In the case of the common search space, terminals in a predetermined group or all terminals should receive the PDCCH, so that the common search space may be defined as a set of pre-arranged CCEs. Scheduling allocation information of the terminal-specific PDSCH or PUSCH may be received by searching a UE-specific search space of the PDCCH. The UE-specific search space may be defined in a UE-specific manner as a terminal identity and a function of various system parameters.

In the 5G system, parameters for the PDCCH search space may be configured in the terminal by the gNB through higher-layer signaling (for example, SIB, MIB, or RRC signaling). For example, the gNB may configure, in the terminal, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a control resource set index for monitoring the search space. For example, the following information may be included.

TABLE 8

```
SearchSpace ::=                                                    SEQUENCE {
    -- Identity of the search space. SearchSpaceId = 0 identifies the SearchSpace
configured via PBCH (MIB) or ServingCellConfigCommon.
    searchSpaceId
        SearchSpaceId,
        (ID of search space)
    controlResourceSetId
        ControlResourceSetId,
        (ID of control resource set)
```

TABLE 8-continued

```
    monitoringSlotPeriodicityAndOffset            CHOICE {
        (period of level of slot to be monitored)
        sl1
            NULL,
        sl2
            INTEGER (0..1),
        sl4
            INTEGER (0..3),
        sl5
        INTEGER (0..4),
        sl8
            INTEGER (0..7),
        sl10
        INTEGER (0..9),
        sl16
        INTEGER (0..15),
        sl20
        INTEGER (0..19)
    }
            OPTIONAL,
    monitoringSymbolsWithinSlot                  BIT
STRING (SIZE (14))
                                       OPTIONAL,
        (symbol within slot to be monitored)
    nrofCandidates
    SEQUENCE {
        (number of PDCCH candidates for each aggregation level)
            aggregationLevel1
        ENUMERATED {n0, n1, n2, n3, n4, n5, n6, n8},
            aggregationLevel2
        ENUMERATED {n0, n1, n2, n3, n4, n5, n6, n8},
            aggregationLevel4
        ENUMERATED {n0, n1, n2, n3, n4, n5, n6, n8},
            aggregationLevel8
        ENUMERATED {n0, n1, n2, n3, n4, n5, n6, n8},
            aggregationLevel16
        ENUMERATED {n0, n1, n2, n3, n4, n5, n6, n8}
    },
    searchSpaceType
    CHOICE {
    (type of search space)
            -- Configures this search space as common search space (CSS) and
DCI formats to monitor.
        common
            SEQUENCE {
    (command search space)
        }
            ue-Specific
            SEQUENCE {
    (UE-specific search space)
                -- Indicates whether the UE monitors in this USS for DCI
formats 0-0 and 1-0 or for formats 0-1 and 1-1.
            formats
            ENUMERATED {formats0-0-And-1-0, formats0-1-And-1-
1},
              ...
        }
```

The gNB may configure one or a plurality of search space sets in the terminal according to the configuration information. For example, the gNB may configure search space set 1 and search space 2 in the terminal, and the configuration may be performed such that DCI format A, scrambled by an X-RNTI in search space set 1, is monitored in the common search space and DCI format B scrambled by a Y-RNTI in search space set 2 is monitored in the UE-specific search space.

According to the configuration information, there may be one or a plurality of search space sets in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The above RNTIs may comply with the following definition and purpose.

C-RNTI(cell RNTI): used for UE-specific PDSCH scheduling

TC-RNTI(temporary cell RNTI): used for UE-specific PDSCH scheduling

CS-RNTI (configured scheduling RNTI): used for semi-statically configured UE-specific PDSCH scheduling RA-RNTI (random access RNTI): used for scheduling PDSCH at random access stage P-RNTI (paging RNTI): used for scheduling PDSCH through which paging is transmitted SI-RNTI (system information RNTI): used for scheduling PDSCH through which system information is transmitted INT-RNTI (Interruption RNTI): used for indicating whether puncturing is performed for PDSCH TPC-PUSCH-RNTI (transmit power control for PUSCH RNTI): used for indicating PUSCH power control command TPC-PUCCH-RNTI (transmit power control for PUCCH RNTI): used for indicating PUCCH power control command TPC-SRS-RNTI (transmit power control for SRS RNTI): used for indicating SRS power control command The above DCI formats may comply with the following definition.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where the UE may assume no transmission is intended for the UE |
| 2_2 | Transmission of TPC commands for PUCCH and PUSCH |
| 2_3 | Transmission of a group of TPC commands for SRS transmissions by one or more UEs |

Since a plurality of search space sets may be configured as different parameters (for example, the parameters in [Table 8]) in 5G, the search space set that the terminal monitors may be different each time. For example, if search space set #1 is configured in an X-slot period, search space set #2 is configured in a Y-slot period, and X and Y are different from each other, the terminal may monitor both search space set #1 and search space set #2 in a specific slot and may monitor only one of search space set #1 and search space set #2 in another specific slot.

If a plurality of search space sets is configured in the terminal, the method of determining the search space set that the terminal should monitor may consider the following conditions.

[Condition 1: Limits on the Maximum Number of PDCCH Candidates]

The number of PDCCH candidates that can be monitored per slot does not exceed $M^\mu$. $M^\mu$ may be defined as the maximum number of PDCCH candidates per slot in a cell configured to have subcarrier spacing of 15.4 kHz, as shown in the following table.

TABLE 10

| μ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limits on the Maximum Number of CCEs]

The number of CCEs included in all search spaces per slot (all search spaces are all sets of CCEs corresponding to a union area of a plurality of search space sets) does not exceed $C^\mu$. $C^\mu$ may be defined as the maximum number of CCEs per slot in a cell configured to have subcarrier spacing of 15·2 μkHz, as shown in the following table.

TABLE 11

| μ | Maximum number of CCEs per slot and per serving cell ($C^\mu$) |
| --- | --- |
| 0 | 56 |
| 1 | 56 |
| 2 | 48 |
| 3 | 32 |

For convenience of description of technology, the situation where both conditions 1 and 2 are satisfied at a specific time point is defined as "condition A". Accordingly, failure to satisfy condition A may mean that at least one of conditions 1 and 2 is not satisfied.

Condition A may not be satisfied at a specific time point depending on the configuration of search space sets by the gNB. If condition A is not satisfied at a specific time point, the terminal may select and monitor only some of the search space sets configured to satisfy condition A at the corresponding time point, and the gNB may transmit the PDCCH through the selected search space sets.

A method of selecting some of all configured search space sets may be described below.

[Method 1]

If condition A for the PDCCH is not satisfied at a specific time point (slot), the terminal (or the gNB) may select a search space set of which a search space type is configured as a common search space among search space sets existing at the corresponding time point in preference to a search space set of which a search space type is configured as a UE-specific search space.

If all search space sets of which the search space type is configured as the common search space are selected (that is, if condition A is satisfied even after all search spaces of which the search space type is configured as the common search space are selected), the terminal (or the gNB) may select search space sets of which the search space type is configured as the UE-specific search space. At this time, if the number of search space sets of which the search space type is configured as the UE-specific search space is plural, a search space set having a lower search space set index may have a higher priority. UE-specific search space sets may be selected within the range within which condition A is satisfied in consideration of the priority.

Subsequently, a configured grant-based type of 5G is described.

Figure 6:
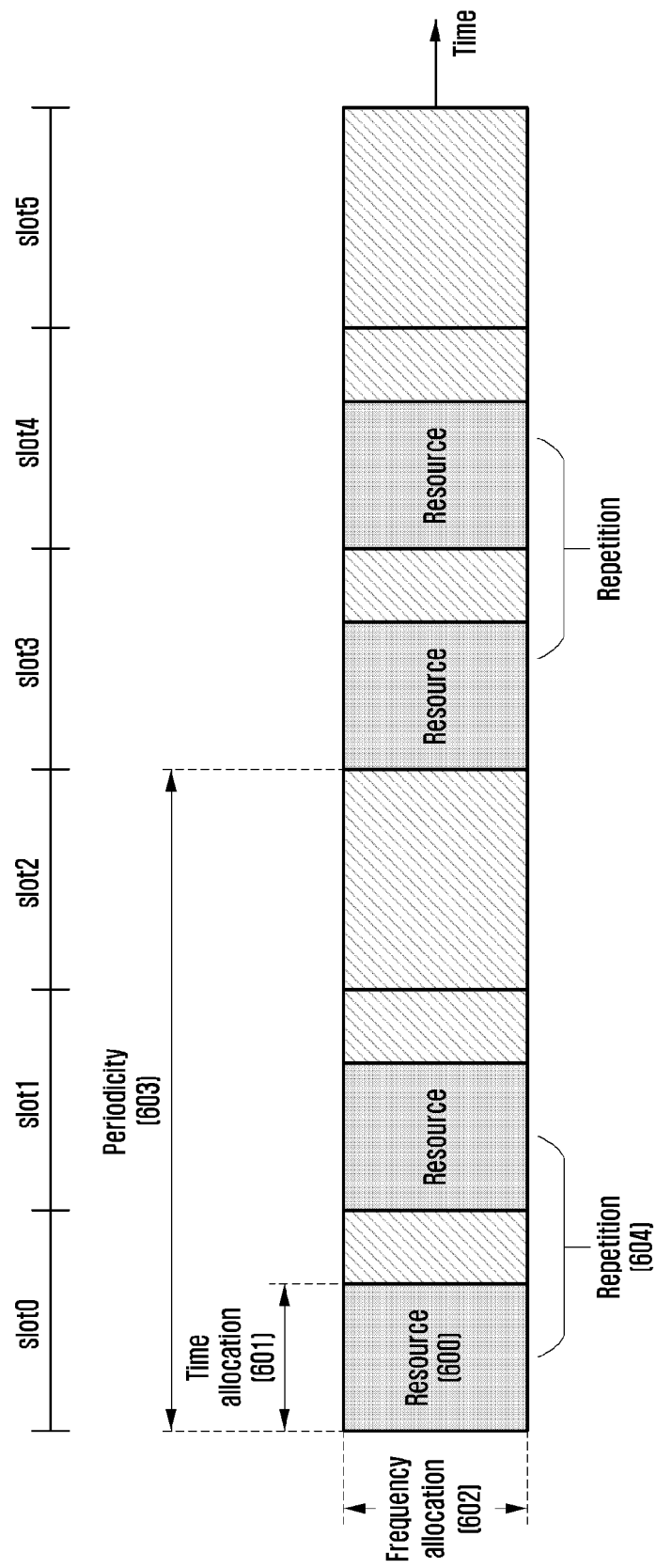
FIG. 6 illustrates an example of transmission with a configured grant in 5G according to an embodiment of the disclosure.

FIG. 6 illustrates an example of a configured grant-based type of 5G according to an embodiment of the disclosure.

In 5G, for a method of transmission with a configured grant (or a grant free uplink data channel transmission method), two types (type-1 PUSCH transmission with a configured grant and type 2 PUSCH transmission with a configured grant) are supported.

[Type-1 PUSCH Transmission with a Configured Grant]

In type-1 PUSCH transmission with a configured grant, the gNB may configure specific time/frequency resources 600 for allowing PUSCH transmission with a configured grant in the terminal through higher-layer signaling, for example, RRC signaling. For example, as illustrated in FIG. 6, time-axis allocation information 601, frequency-axis allocation information 602, and frequency information 603 may be configured for the resources 600. Further, the gNB may configure various parameters for PUSCH transmission (for example, frequency hopping, DMRS configuration, MCS table, MCS, resource block group (RBG) size, the number of repetitive transmissions, and redundancy version (RV)) in the terminal through higher-layer signaling. More specifically, configuration information in [Table 12] below may be included.

TABLE 12

```
ConfiguredGrantConfig ::=                                   SEQUENCE {
        frequencyHopping ( frequency hopping)               ENUMERATED {mode1, mode2}
                                                                        OPTIONAL,
        -- Need S,
        cg-DMRS-Configuration (DMRS configuration)          DMRS-
UplinkConfig,
        mcs-Table
        ENUMERATED {qam256, spare1}
                OPTIONAL,    -- Need S
        mcs-TableTransformPrecoder (MCS table)              ENUMERATED
{qam256, spare1}
                OPTIONAL,    -- Need S
        uci-OnPUSCH (UCI on PUSCH)
        SetupRelease { CG-UCI-OnPUSCH },
        resourceAllocation     (resource allocation type)   ENUMERATED
{ resourceAllocationType0, resourceAllocationType1, dynamicSwitch },
        rbg-Size (RBG size)
        ENUMERATED {config2}
                            OPTIONAL,    -- Need S
        powerControlLoopToUse(closed loop power control)    ENUMERATED
{n0, n1},
        p0-PUSCH-Alpha (power control parameter)
            P0-PUSCH-AlphaSetId,
        transformPrecoder (whether to applytransform precoding)   ENUMERATED
{enabled}
            OPTIONAL,    -- Need S
        nrofHARQ-Processes (the number of HARQ processes)
        INTEGER(1..16),
        repK (the number of repetitiions)
        ENUMERATED {n1, n2, n4, n8},
        repK-RV (redundancy version)                        ENUMERATED {s1-
0231, s2-0303, s3-0000}                                                 OPTIONAL,    -- Cond
RepK
        periodicity (period)
        ENUMERATED {
            sym2, sym7, sym1x14, sym2x14, sym4x14, sym5x14, sym8x14, sym10x14,
sym16x14, sym20x14,
            sym32x14, sym40x14, sym64x14, sym80x14, sym128x14, sym160x14,
sym256x14, sym320x14, sym512x14,
            sym640x14, sym1024x14, sym1280x14, sym2560x14, sym5120x14,
            sym6, sym1x12, sym2x12, sym4x12, sym5x12, sym8x12, sym10x12,
sym16x12, sym20x12, sym32x12,
            sym40x12, sym64x12, sym80x12, sym128x12, sym160x12, sym256x12,
sym320x12, sym512x12, sym640x12,
            sym1280x12, sym2560x12
        },
        configuredGrantTimer (configured grant timer)              INTEGER
(1..64)
                OPTIONAL,    -- Need R
        rrc-ConfiguredUplinkGrant                                  SEQUENCE {
                timeDomainOffset(time domain offset)
            INTEGER   (0..5119),
                timeDomainAllocation(time domain allocation)
            INTEGER   (0..15),
                frequencyDomainAllocation(frequency domain allocation)
            BIT STRING (SIZE(18)),
            antennaPort(antenna port)                              INTEGER   (0..31),
            dmrs-SeqInitialization(DMRS sequence initialization)
        INTEGER (0..1)
                OPTIONAL,    -- Cond NoTransformPrecoder
            precodingAndNumberOfLayers(precoding and the number of layers)
                INTEGER   (0..63),
            srs-ResourceIndicator(SRS resource indicator)          INTEGER
(0..15),
                mcsAndTBS(MCS and TBS)
            INTEGER (0..31),
                frequencyHoppingOffset(frequency-hopping offset)
            INTEGER (1.. maxNrofPhysicalResourceBlocks−1)           OPTIONAL,
```

TABLE 12-continued

```
        -- Need M
                pathlossReferenceIndex(Path-loss reference index)
    INTEGER (0..maxNrofPUSCH-PathlossReferenceRSs−1),
                ...
    }
                                      OPTIONAL    -- Need R
}
```

If configuration information for type-1 PUSCH transmission with a configured grant is received from the gNB, the terminal may transmit the PUSCH without a grant of the gNB through the periodically configured resources 600. Various parameters required for PUSCH transmission (for example, frequency hopping, DMRS configuration, MCS, resource block group (RBG) size, the number of repetitive transmissions, redundancy version (RV), precoding and the number of layers, antenna port, and frequency-hopping offset) may all follow configured values provided by the gNB.

[Type-2 PUSCH Transmission with a Configured Grant]

In type-2 PUSCH transmission with a configured grant, the gNB may configure some (for example, period information 603) of the information on specific time/frequency resources 600 for allowing PUSCH transmission with a configured grant in the terminal through higher-layer signaling (for example, RRC signaling). Further, the gNB may configure various parameters for PUSCH transmission (for example, frequency hopping, DMRS configuration, MCS table, MCS, resource block group (RBG) size, the number of repetitive transmissions, and redundancy version (RV)) in the terminal through higher-layer signaling. More specifically, the gNB may configure configuration information in [Table 13] below in the terminal through higher-layer signaling.

TABLE 13

```
ConfiguredGrantConfig ::=                                         SEQUENCE {
        frequencyHopping (frequency hopping)                          ENUMERATED
{mode1, mode2}
            OPTIONAL,      -- Need S,
            cg-DMRS-Configuration (DMRS configuration)                DMRS-
UplinkConfig,
        mcs-Table
        ENUMERATED {qam256, spare1}
                OPTIONAL,      -- Need S
            mcs-TableTransformPrecoder (MCS table)                    ENUMERATED
{qam256, spare1}
            OPTIONAL,      -- Need S
        uci-OnPUSCH (UCI on PUSCH)
        SetupRelease { CG-UCI-OnPUSCH },
            resourceAllocation        (resource allocation type)      ENUMERATED
{ resourceAllocationType0, resourceAllocationType1, dynamicSwitch },
            rbg-Size (RBG size)
            ENUMERATED {config2}
                            OPTIONAL,       -- Need S
            powerControlLoopToUse(closed loop power control)          ENUMERATED
{n0, n1},
            p0-PUSCH-Alpha (power control parameter)
                P0-PUSCH-AlphaSetId,
            transformPrecoder (whether to apply transform precoding)
            ENUMERATED {enabled}
                            OPTIONAL,       -- Need S
            nrofHARQ-Processes (the number of HARQ processes)
            INTEGER(1..16),
            repK (the number of repetitions)
            ENUMERATED {n1, n2, n4, n8},
            repK-RV (redundancy version)                              ENUMERATED {s1-
0231, s2-0303, s3-0000}    OPTIONAL,     -- Cond
RepK
        periodicity (period)
        ENUMERATED {
                sym2, sym7, sym1×14, sym2×14, sym4×14, sym5×14, sym8×14, sym10×14,
sym16×14, sym20×14,
                sym32×14, sym40×14, sym64×14, sym80×14, sym128×14, sym160×14,
sym256×14, sym320×14, sym512×14,
                sym640×14, sym1024×14, sym1280×14, sym2560×14, sym5120×14,
                sym6, sym1×12, sym2×12, sym4×12, sym5×12, sym8×12, sym10×12,
```

TABLE 13-continued

```
sym16x12, sym20x12, sym32x12,
        sym40x12, sym64x12, sym80x12, sym128x12, sym160x12, sym256x12,
sym320x12, sym512x12, sym640x12,
        sym1280x12, sym2560x12
    },
    configuredGrantTimer (configured grant timer)        INTEGER
(1..64)
        OPTIONAL,    -- Need R
}
```

The gNB may configure a configured scheduling (CS)-RNTI in the terminal, and the terminal may monitor a DCI format scrambled with the CS-RNTI. The DCI scrambled with the CS-RSNTI may be used to activate type-2 PUSCH transmission with a configured grant (that is, to allow type-2 PUSCH transmission with a configured grant). For example, if a DCI field of the DCI format scrambled with the CS-RNTI received by the terminal satisfies the following condition, it may be determined as a trigger of PUSCH transmission with a configured grant.

TABLE 14

| DCI format 0_0/0_1 | |
| --- | --- |
| HARQ process number | set to all '0's |
| Redundancy version | set to '00' |

The gNB may indicate the trigger of the PUSCH transmission with a configured grant through specific field values to the terminal, and may also inform the terminal of detailed time allocation information 601 and frequency allocation information 602 for the resource region 600 in which PUSCH transmission with a configured grant can be performed through a resource allocation field of the corresponding DCI. The terminal may determine the resource region 600 for PUSCH transmission with a configured grant on the basis of the period information 603 configured through a higher layer and the time resource allocation information 601 and the frequency resource allocation information 602 acquired from the DCI scrambled with the CS-RNTI corresponding to the trigger and perform the PUSCH transmission with the configured grant in the corresponding resource region 600. That is, the terminal may transmit the PUSCH through the periodically configured resources 600 after the time point at which DCI corresponding to the trigger is received without a grant of the gNB. Some of various parameters (the parameter in [Table 13] above such as DMRS configuration information, MCS table, RBG size, the number of repetitive transmissions, RV, and power control parameter) required to transmit the PUSCH by the terminal may all have values configured by the gNB through higher-layer signaling, and other parameters (for example, parameters corresponding to a field of DCI format 0_0/0_1 such as MCS, precoding and the number of layers, antenna port, and frequency-hopping offset) may have preset values made known through DCI scrambled with the CS-RNTI for a received trigger.

The gNB may transmit DCI scrambled with the CS-RSNTI to release PUSCH transmission with a configured grant (that is, to stop allowing PUSCH transmission with the configured grant to the terminal), and at this time, if a field of a format of the DCI scrambled with the CS-RNTI, received by the terminal, satisfies the following condition, the terminal may determine it as release of PUSCH transmission with the configured grant.

TABLE 15

| DCI format 0_0 | |
| --- | --- |
| HARQ process number | set to all '0's |
| Redundancy version | set to '00' |
| Modulation and coding scheme | set to all '1's |
| Resource block assignment | set to all '1's |

Subsequently, a beam failure recovery (BFR) (also referred to as link recovery) procedure of the 5G communication system will be described.

Figure 7:
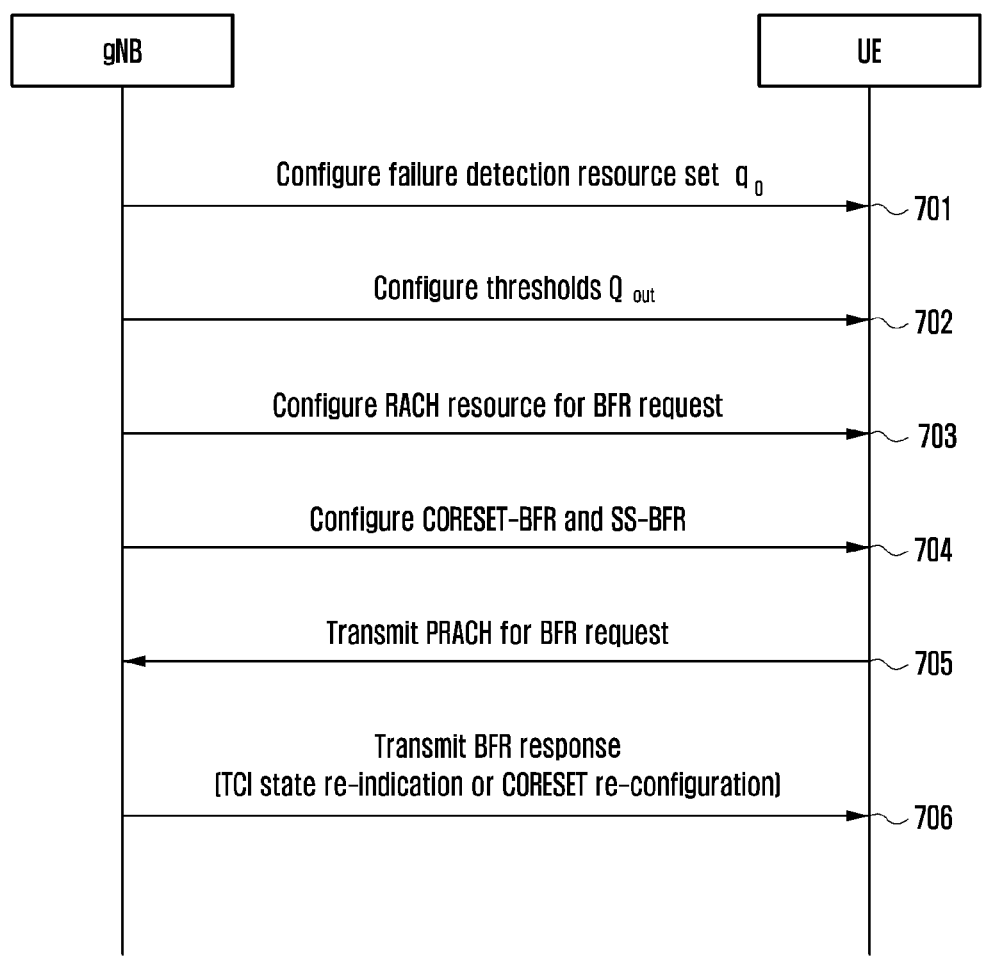
FIG. 7 illustrates a beam failure recovery process in 5G according to an embodiment of the disclosure.

FIG. 7 illustrates a beam failure recovery (BRF) procedure in the 5G communication system according to an embodiment of the disclosure.

In step 701, the gNB may configure a periodic channel state information reference signal (CSI-RS) resource configuration index set $q_0$ in the terminal in order to detect beam failure (or link failure) through higher-layer signaling (for example, RRC signaling). If the terminal has not received the configuration of $q_0$ from the gNB, the terminal may determine the set $q_0$ on the basis of SS/PBCH block indexes or periodic CSI-RS resource indexes indicated by TCI states (corresponding to TCI states in [Table 7]) configured in control resource sets. In step 702, the gNB may configure a threshold value $Q_{out}$ in the terminal in order to determine whether beam failure occurs through higher-layer signaling (for example, RRC signaling). In step 703, the gNB may configure random access channel (RACH) resources in the terminal in order to transmit a BFR request message through higher-layer signaling (for example, RRC signaling). In step 704, the gNB may configure a control-resource-set BFR (CORESET-BFR) and a search-space BFR (SS-BFR) for receiving the PDCCH to respond to the BFR request in the terminal through higher-layer signaling (for example, RRC signaling). At this time, the gNB may configure the terminal to monitor the DCI format scrambled with the C-RNTI as a portion of the configuration for the search space.

The terminal may measure a link quality in CSI-RS resources (or SS/PSBH block) corresponding to an index within a set $q_0$ configured (determined as a TCI state of a control resource set) in step 701. The terminal may compare the measured link quality with the threshold value $Q_{out}$ configured in step 702. If the link quality in all measurement resources configured as $_q0$ is lower than the threshold value $Q_{out}$, the terminal may determine beam failure (or link failure).

If the terminal determines beam failure, the terminal may transmit a BFR request message to the gNB through one of the RACH resources configured in step 703 in step 705. If the terminal transmits the BFR request message to the gNB in slot n, the terminal may monitor the DCI scrambled with the C-RNTI on the basis of the control-resource-set BFR and the search-space BFR configured in step 704 for a specific time from slot n+4.

If the gNB receives the BFR request message from the terminal in step 705, the gNB may transmit a BFR response message in step 706. At this time, the gNB may transmit the DCI scrambled with the C-RNTI through the control-resource-set BFR and the search-space BFR configured in step 704. The gNB may newly activate TCI states of control resource sets configured in the terminal through medium access control (MAC) control element (CE) signaling. Alternatively, the gNB may inform the UE of reconfiguration of control resource sets through RRC signaling.

If the terminal receives information on the reconfiguration of TCIs for control resource sets or the reconfiguration of the control resource sets from the gNB through the BFR response message in step 706, the terminal may stop monitoring the control-resource-set BFR and the search-space BFR configured in step 704.

Embodiment 1

In the 5G communication system, traffic corresponding to a type of service having strict requirements (ultra-high reliability or ultra-low latency) such as URLLC may be processed with a higher priority than traffic corresponding to eMBB or mMTC in order to satisfy the corresponding requirements. In an embodiment of the disclosure, traffic corresponding to a service requiring a relatively high priority is referred to as "first traffic" and traffic corresponding to a service having a relatively low priority is referred to as "second traffic". For example, URLLC may correspond to first traffic, and eMBB or mMTC may correspond to second traffic. Alternatively, the first traffic and the second traffic may be separately provided to the terminal as determined by the gNB. Meanwhile, the first traffic and the second traffic may be determined to be relative to each other. If the terminal is able to distinguish the first traffic from the second traffic in a physical layer, different priorities may be applied to transmission and reception of various physical-layer channels such that a higher priority may be applied to the first traffic. Applying a higher priority may mean that various physical-layer channels corresponding to the first traffic, for example, a data channel, a control channel, and a reference signal, are transmitted and received in preference to physical-layer channels corresponding to the second traffic. Accordingly, it is important for the terminal to recognize whether the channel that the terminal desires to currently transmit and receive in a physical layer is the channel corresponding to the first traffic. According to [Embodiment 1] of the disclosure, the terminal may distinguish the first traffic from other traffic through one or more of the following methods or a combination thereof.

Method 1

DCI for scheduling a data channel corresponding to first traffic may be scrambled with a specific RNTI (for example, a C1-RNTI). The terminal may receive the C1-RNTI from the gNB, and may determine that the data channel scheduled by the DCI scrambled with the C1-RNTI corresponds to the first traffic.

Method 2

DCI for scheduling a data channel corresponding to first traffic may be defined in a specific format (for example, DCI format 0-2 for uplink or DCI format 1-2 for downlink). The terminal may receive a configuration indicating monitoring of DCI format 0-2/1-2 from the gNB and may monitor DCI format 0-2/1-2 according to the configuration. The terminal may determine that a data channel scheduled in DCI format 0-2/1-2 corresponds to first traffic.

Method 3

The type of search space in which DCI for scheduling a data channel corresponding to first traffic is monitored is defined as a specific search space type (for example USS1). The terminal may receive the configuration of a search space type corresponding to USS1 from the gNB and determine that a data channel scheduled by DCI detected in the search space having the search space type of USS1 corresponds to first traffic.

Method 4

A search space in which DCI for scheduling a data channel corresponding to first traffic is monitored may have a specific configuration (referred to as a first search space configuration). The first search space configuration may include at least one or a plurality of pieces of configuration information below.

Configuration information indicating that the interval between the closest monitoring occasions corresponds to X (symbols) or smaller Configuration information indicating that the number of monitoring occasions within the slot corresponds to Y or more Configuration information indicating that a search space ID (or index) is designated to a predetermined specific value Configuration information indicating that first traffic or second traffic is explicitly configured by a configuration parameter within the search space The terminal may receive a configuration of a search space having a first search space configuration from the gNB and determine that a data channel scheduled by DCI detected in the corresponding search space corresponds to first traffic.

Method 5

A control resource set in which DCI for scheduling a data channel corresponding to first traffic is monitored may have a specific configuration (referred to as a first control resource set configuration). The first control resource set configuration may include, for example, at least one or a plurality of pieces of configuration information below.

Configuration information indicating a control resource set ID (or index) is designated to a predefined specific value Configuration information indicating that first traffic or second traffic is explicitly configured by a configuration parameter within the control resource set The terminal may receive the configuration of a control resource set having a first control resource set configuration from the gNB and determine that a data channel scheduled by DCI detected in the corresponding search space corresponds to first traffic.

Method 6

The gNB may configure, in advance, in the terminal, a specific bandwidth part (referred to as a first bandwidth part) in which a data channel corresponding to first traffic can be scheduled. The first bandwidth part may include, for example, at least one or a plurality of pieces of configuration information below.

Subcarrier spacing of the bandwidth part may be configured as a value larger than a predefined specific value (X).

Configuration information indicating that a bandwidth part ID (or index) is designated to a predefined specific value Configuration information indicating first traffic or second traffic is explicitly configured by a configuration parameter with the bandwidth part The terminal may receive the configuration of the first bandwidth part from the gNB and determine that a data channel scheduled by DCI detected in the first bandwidth part, a data channel scheduled by the first bandwidth part, or a data channel scheduled by the first bandwidth part by the DCI detected in the first bandwidth part corresponds to first traffic.

The terminal may determine whether the data channel corresponds to first traffic through the above methods and differentially assign a priority on the basis thereof.

Embodiment 2

<Embodiment 2> of the disclosure proposes a method of preferentially monitoring a PDCCH corresponding to first traffic. The gNB may configure one or a plurality of search space sets in the terminal. If a plurality of search space sets is configured in the terminal, the method of determining the search space set that the terminal should monitor may consider the following conditions.

[Condition 1: Limits on the Maximum Number of PDCCH Candidates]

The number of PDCCH candidates that can be monitored per slot does not exceed AP. $M^\mu$ may be defined as the maximum number of PDCCH candidates per slot in a cell configured to have subcarrier spacing of 15.4 kHz, as shown in [Table 10].

[Condition 2: Limits on the Maximum Number of CCEs]

The number of CCEs included in all search spaces per slot (all search spaces are all sets of CCEs corresponding to a union area of a plurality of search space sets) does not exceed $C^\mu$. $C^\mu$ may be defined as the maximum number of CCEs per slot in a cell configured to have subcarrier spacing of 15·2 μkHz as shown in [Table 11].

The situation in which both conditions 1 and 2 are satisfied at a specific time point is defined as "condition A". Accordingly, failure to satisfy condition A may mean that at least one of conditions 1 and 2 is not satisfied.

Condition A may not be satisfied at a specific time point depending on the configuration of search space sets by the gNB. If condition A is not satisfied at a specific time point, the terminal may select and monitor only some of the search space sets configured to satisfy condition A at the corresponding time point, and the gNB may transmit the PDCCH through the selected search space sets.

The terminal may determine a search space set configured for first traffic through the methods described in <Embodiment 1> For example, in [Method 1] of <Embodiment 1>, the terminal may determine that a search space set configured to monitor DCI scrambled with the C1-RNTI is a search space set configured for first traffic. For example, in [Method 2] of <Embodiment 1>, the terminal may determine that a search space set configured to monitor DCI format 0-2/1-2 is a search space set for first traffic. Since the above determination may be equally applied to the remaining methods, a detailed description thereof is omitted. If the terminal receives a configuration to monitor a search space set configured for first traffic from the gNB and condition A is not satisfied at the specific time point, the terminal may select and monitor only some the configured search space sets through at least one of the following methods or a combination of one or more thereof.

Method 1

If condition A for the PDCCH is not satisfied at a specific time point (slot), the terminal and the gNB may most preferentially select a search space set configured for first traffic from among search space sets to be monitored at the corresponding time point, in comparison with other search space sets. For example, the search space sets may be selected according to the following priority. The priority is higher as the number thereof is lower.

TABLE 16

| Search space set | Priority |
| --- | --- |
| Search space set configured for first traffic | 1 |
| Search space set configured for BFR | 2 |
| Search space set configured as common search space | 3 |
| Search space set configured as UE-specific search space | 4 |

The terminal and the gNB may sequentially select the search space set to be monitored at the corresponding time point in descending order of priority according to the above table. If condition A is still satisfied after a search space set corresponding to a specific priority is selected, search space sets corresponding to the next highest priority may be further selected. At this time, if the number of search space sets of which the search space type is configured as the UE-specific search space is plural, a search space set having a lower search space set index may have a higher priority. UE-specific search space sets may be selected within the range within which condition A is satisfied in consideration of the priority thereof.

Through [Method 1], it is possible to minimize a delay time that may occur in data transmission and reception corresponding to first traffic such that the requirements of the first traffic are satisfied by assigning the first priority to monitoring of the first traffic.

Method 2

If condition A for the PDCCH is not satisfied at a specific time point (slot), the terminal and the gNB may most preferentially select a search space set configured for BFR from among search space sets to be monitored at the corresponding time point in comparison with other search space sets, and may then select a search space set configured for first traffic. For example, the search space sets may be selected according to the following priority. The priority is higher as the number thereof is lower.

TABLE 17

| Search space set | Priority |
| --- | --- |
| Search space set configured for BFR | 1 |
| Search space set configured for first traffic | 2 |
| Search space set configured as common search space | 3 |
| Search space set configured as UE-specific search space (Search space set has higher priority as search space set index is lower) | 4 |

The terminal and the gNB may sequentially select the search space set to be monitored at the corresponding time point in descending order of priority according to the above table. If condition A is still satisfied after a search space set corresponding to a specific priority is selected, search space sets corresponding to the next highest priority may be further selected. At this time, if the number of search space sets of which the search space type is configured as the UE-specific search space is plural, a search space set having a lower search space set index may have a higher priority. UE-specific search space sets may be selected within the range within which condition A is satisfied in consideration of the priority thereof.

Through [Method 2], the terminal may determine beam failure and then preferentially perform beam failure recovery by providing the first priority to monitoring of the search space set configured for BFR. If beam failure recovery is not successful, it may be difficult to successfully receive scheduling of data corresponding to first traffic, and thus it may be preferable to provide the first priority to beam failure recovery. Next, it is possible to reduce a delay time that may occur in data transmission and reception corresponding to first traffic as long as possible such that the requirements of the first traffic are satisfied by providing the next highest priority to monitoring of first traffic.

Method 3

If condition A for the PDCCH is not satisfied at a specific time point (slot), the terminal and the gNB may most preferentially select a search space set configured for BFR from among search space sets to be monitored at the corresponding time point in comparison with other search space sets. Next, a search space set configured as a common search space may be selected. Next, a search space set configured for first traffic may be selected. For example, the search space sets may be selected according to the following priority. The priority is higher as the number thereof is lower.

TABLE 18

| Search space set | Priority |
| --- | --- |
| Search space set configured for BFR | 1 |
| Search space set configured as common search space | 2 |
| Search space set configured for first traffic | 3 |
| Search space set configured as UE-specific search space (Search space set has higher priority as search space set index is lower) | 4 |

The terminal and the gNB may sequentially select the search space set to be monitored at the corresponding time point in descending order of priority according to the above table. If condition A is still satisfied after a search space set corresponding to a specific priority is selected, search space sets corresponding to the next highest priority may be further selected. At this time, if the number of search space sets of which the search space type is configured as the UE-specific search space is plural, a search space set having a lower search space set index may have a higher priority. UE-specific search space sets may be selected within the range within which condition A is satisfied in consideration of the priority thereof.

Through [Method 2], the terminal may determine beam failure and then preferentially perform beam failure recovery by providing the first priority to monitoring of the search space set configured for BFR. If beam failure recovery is not successful, it may be difficult to successfully receive scheduling of data corresponding to first traffic, and thus it may be preferable to provide the first priority to beam failure recovery. The next highest priority may be provided to monitoring of the search space set configured as the common search space. Since DCI transmitted in the common search space may correspond to system information, paging, random access, and fallback DCI (for example, DCI format 0-0/1-0), it may be preferable to provide a higher priority to DCIs having relatively high importance. Next, it is possible to reduce a delay time that may occur in data transmission and reception corresponding to first traffic such that the requirements of the first traffic are satisfied by providing a higher priority to monitoring of first traffic than other UE-specific search space sets.

Method 4

If condition A for the PDCCH is not satisfied at a specific time point (slot) and if a search space type of a search space set configured for first traffic is a UE-specific search space, the terminal and the gNB may provide the same priority to the search space set configured for first traffic and other search space sets configured as UE-specific search spaces and preferentially select a search space set having a low index on the basis of search space set indexes. For example, the search space sets may be selected according to the following priority.

TABLE 19

| Search space set | Priority |
| --- | --- |
| Search space set configured for BFR | 1 |
| Search space set configured as common search space | 2 |
| Search space set configured for first traffic, search space set configured as UE-specific search space (search space set has higher priority as search space set index is lower) | 3 |

The terminal and the gNB may sequentially select the search space set to be monitored at the corresponding time point in descending order of priority according to the above table. If condition A is still satisfied after a search space set corresponding to a specific priority is selected, search space sets corresponding to the following priority may be further selected. At this time, if the number of search space sets of which the search space type is configured as the UE-specific search space is plural, a search space set having a lower search space set index may have a higher priority. UE-specific search space sets may be selected within the range within which condition A is satisfied in consideration of the priority thereof.

Through [Method 3], the terminal may determine beam failure and then most preferentially perform beam failure recovery by providing the first priority to monitoring of the search space set configured for BFR. If beam failure recovery is not successful, it may be difficult to successfully receive scheduling of data corresponding to first traffic, and thus it may be preferable to provide the first priority to beam failure recovery. The following priority may be provided to monitoring of the search space set configured as the common search space. Since DCI transmitted in the common search space may correspond to system information, paging, random access, and fallback DCI, it may be preferable to provide a high priority to DCIs having high importance. Next, the priority of the search space sets configured for first traffic and other UE-specific search space sets may be randomly determined by the gNB through search space set index allocation.

Method 5

Figure 8:
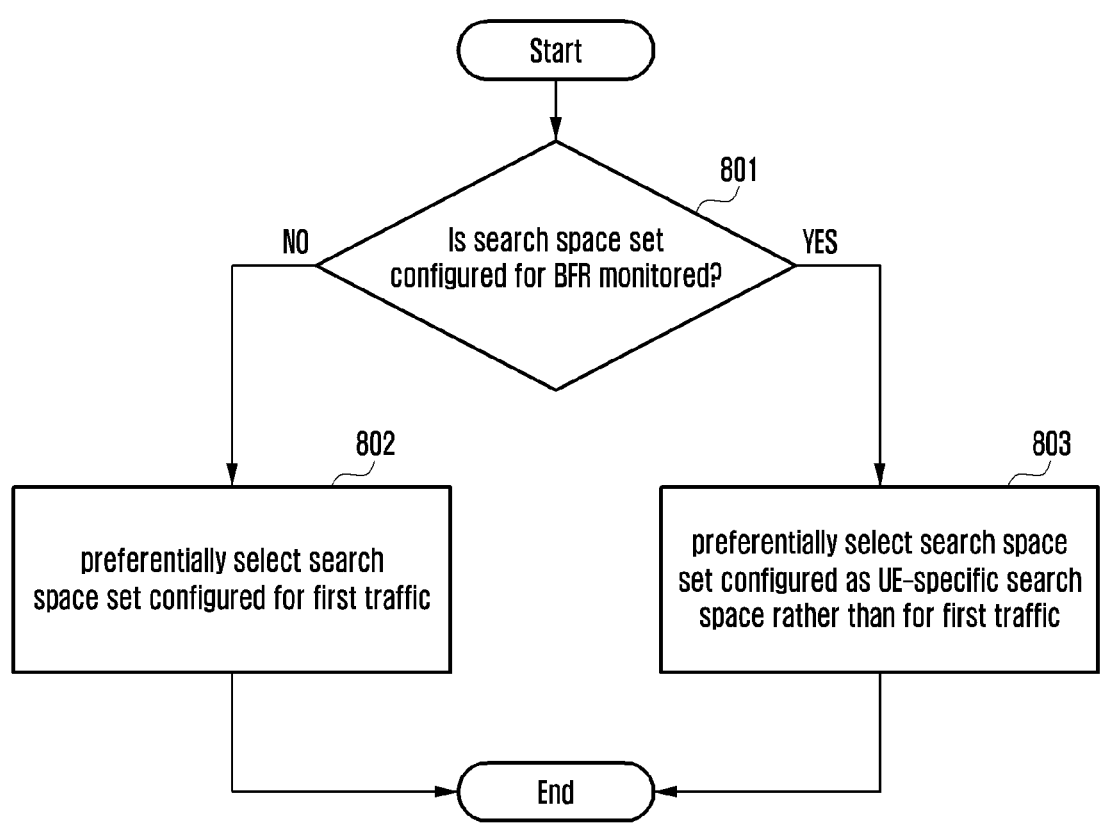
FIG. 8 illustrates [Method 5] of <Embodiment 2> according to the disclosure.

If condition A for the PDCCH is not satisfied at a specific time point (slot), priorities of a search space set configured for first traffic and a search space set configured as a UE-specific search space may be determined on the basis of whether a search space set configured for BFR is monitored. FIG. 8 Corresponds to [Method 5].

The terminal and the gNB may determine whether to monitor a search space set configured for BFR in step 801. If the terminal is not monitoring the search space set configured for BFR at a specific time point, the terminal and the gNB may select a search space set configured for first traffic in preference to other search space sets configured as UE-specific search spaces in step 802. For example, the search space sets may be selected according to the following priority. A link between the gNB and the terminal may be maintained with sufficiently high reliability at the time point at which beam failure recovery is not performed, so it is enough to receive scheduling corresponding to first traffic, and thus it is possible to reduce a delay time by preferentially monitoring the search space set for first traffic.

TABLE 20

| Search space set | Priority |
| --- | --- |
| Search space set configured for BFR | 1 |
| Search space set configured as common search space | 2 |
| Search space set configured for first traffic | 3 |
| Search space set configured as UE-specific search space (search space set has higher priority as search space set index is lower) | 4 |

If the terminal is monitoring the search space set configured for BFR at a specific time point, the terminal and the gNB may select other search space sets configured as UE-specific search spaces in preference to a search space set configured for first traffic in step 803. For example, the search space sets may be selected according to the following priority. The link between the gNB and the terminal is maintained with very low reliability at the time point at which beam failure recovery is performed, so link quality may not be sufficient to receive scheduling corresponding to first traffic requiring relatively high reliability. Accordingly, it may be more preferable to preferentially monitor other normal UE-specific search spaces having relatively low reliability requirements.

TABLE 21

| Search space set | Priority |
| --- | --- |
| Search space set configured for BFR | 1 |
| Search space set configured as common search space | 2 |
| Search space set configured as UE-specific search space (search space set has higher priority as search space set index is lower) | 3 |
| Search space set configured for first traffic | 4 |

Through [Method 5], the terminal may determine beam failure and then preferentially perform beam failure recovery by providing the first priority to monitoring of the search space set configured for BFR. If beam failure recovery is not successful, it may be difficult to successfully receive scheduling of data corresponding to first traffic, and thus it may be preferable to provide the first priority to beam failure recovery. The next highest priority may be provided to monitoring of the search space set configured as the common search space. Since DCI transmitted in the common search space may correspond to system information, paging, random access, and fallback DCI, it may be preferable to provide a high priority to DCIs having high importance. Priorities of the search space set for first traffic and the search space set configured as the UE-specific search space may be determined according to whether the search space set configured for BFR is monitored.

Embodiment 3

In the 5G communication system, the number of DCIs having different sizes, monitored by the terminal at a specific time point, is limited to a specific number or smaller in order to reduce complexity due to DCI decoding of the terminal. For example, the following two conditions may always be satisfied.

[Condition 1] The terminal may monitor DCIs having a maximum of X different sizes per slot.

[Condition 2] The terminal may monitor a maximum of Y DCIs having different sizes per slot for a specific RNTI. The specific RNTI may correspond to, for example, a C-RNTI, a CS-RNTI, an MCS-RNTI, or other UE-specific RNTIs.

The BS may properly control the DCI size to satisfy [Condition 1] and [Condition 2]. The terminal may not expect a configuration of the DCI size that does not satisfy [Condition 1] and [Condition 2].

The size of a resource allocation field on a frequency axis of DCI format 0-0/1-0 monitored in a UE-specific search space may be determined as the size of a currently activated bandwidth part. However, when the size of DCI format 0-0/1-0 monitored in the UE-specific search space is determined as the size of the currently activated bandwidth part, if the condition of the limit on the DCI size is not satisfied, the size of the resource allocation field on the frequency axis of the corresponding DCI format 0-0/1-0 may be determined as the size of an initial bandwidth part. That is, it is possible to reduce the number of DCIs having different sizes by making the size of DCI format 0-0/1-0, monitored in the common search space, and the size of DCI format 0-0/1-0, monitored in the UE-specific search space, the same.

If a new DCI format (for example, DCI format 0-2 and DCI format 1-2) for scheduling data corresponding to first traffic is introduced (for example, corresponding to [Method 2] of <Embodiment 1>) in 5G, a method of arranging the additional DCI size may be required in order to satisfy the defined limit on the DCI size. Embodiment 3 of the disclosure proposes a method of arranging the DCI size in order to satisfy the limit on the DCI size.

Figure 9:
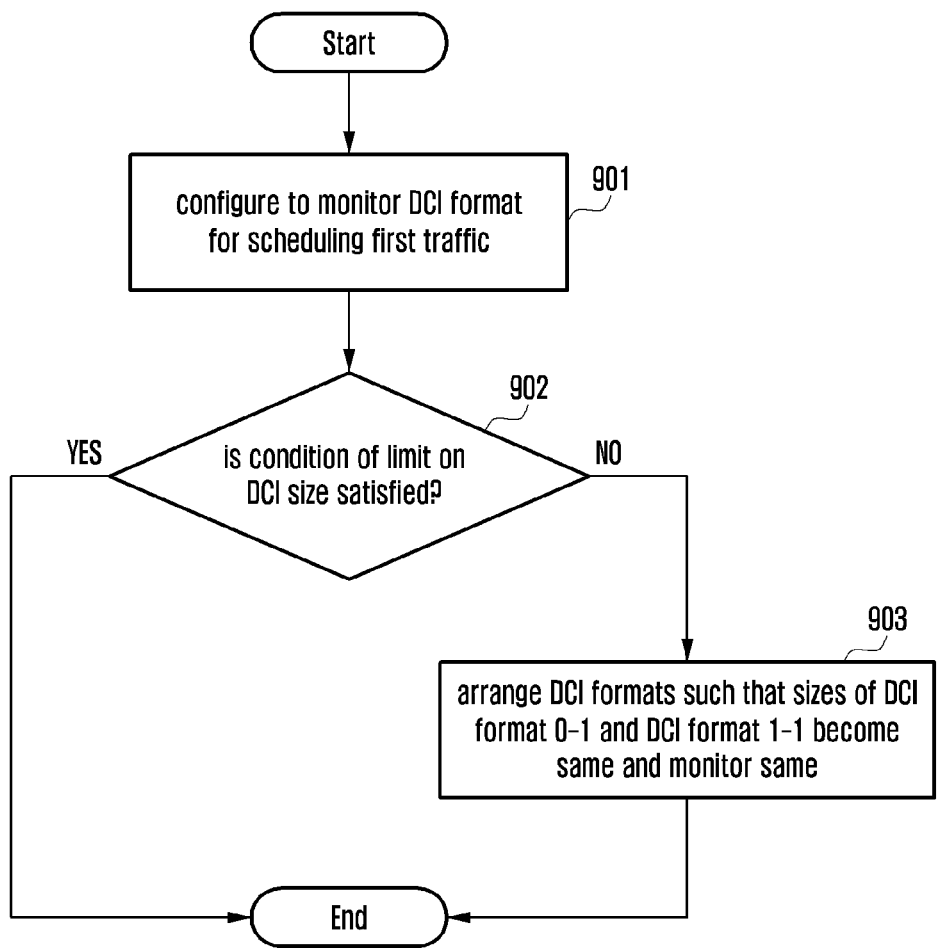
FIG. 9 illustrates a method of arranging the DCI size according to embodiment 3 of the disclosure.

FIG. 9 illustrates a method of arranging the DCI size according to embodiment 3 of the disclosure.

In step 901, the terminal may receive a configuration to monitor a DCI format corresponding to first traffic from the gNB through higher-layer signaling (for example, MIB, SIB, or RRC). In step 902, the terminal may determine whether the condition of the limit on the DCI size, that is, condition 1 or condition 2, is satisfied. If it is determined that the condition of the limit on the DCI size is satisfied in step 902, the terminal may monitor the DCI according to the configuration. If it is determined that the condition of the limit on the DCI size is not satisfied in step 902, the terminal may arrange DCI formats such that the size of DCI format 0-1 and the size of DCI format 1-1 are the same as each other and performing monitoring based on the assumption that the size of DCI format 0-1 and the size of DCI format 1-1 are the same in step 903. The method of making the size of DCI format 0-1 and the size of DCI format 1-1 the same as each other may be at least one of the following methods.

Method 1

Between DCI format 0-1 and DCI format 1-1, the smaller DCI format is adjusted for the larger DCI format by inserting 0 into (i.e. zero-padding) the smaller DCI format. More specifically, if the size of DCI format 0-1 is larger than the size of DCI format 1-1, the size of DCI format 1-1 may be adjusted to be the same as the size of DCI format 0-1 through insertion of 0 into DCI format 1-1. If the size of DCI format 1-1 is larger than the size of the DCI format 0-1, the size of DCI format 0-1 may become the same as the size of DCI format 1-1 through insertion of 0 into DCI format 0-1.

Method 2

Between DCI format 0-1 and DCI format 1-1, the larger DCI format may be adjusted for the smaller DCI format by truncating some bits of the larger DCI format. More specifically, if the size of DCI format 0-1 is larger than the size of DCI format 1-1, the size of the DCI format 0-1 may become the same as the size of DCI format 1-1 through truncation of some bits of DCI format 0-1. If the size of DCI format 1-1 is larger than the size of DCI format 0-1, the size of DCI format 1-1 may become the same as the size of DCI format 0-1 through truncation of some bits of DCI format 1-1.

Method 3

The size of DCI format 1-1 may be adjusted to the size of DCI format 0-1. If the size of DCI format 0-1 is larger than the size of DCI format 1-1, the size of DCI format 1-1 may become the same as the size of DCI format 0-1 through insertion of 0 into (zero-padding) DCI format 1-1. If the size of DCI format 0-1 is smaller than the size of DCI format 1-1, the size of DCI format 1-1 may become the same as the size of DCI format 0-1 through truncation of some bits of DCI format 1-1.

Method 4

The size of DCI format 0-1 may be adjusted to the size of DCI format 1-1. If the size of DCI format 1-1 is larger than the size of DCI format 0-1, the size of DCI format 0-1 may become the same as the size of DCI format 1-1 through insertion of 0 into (zero-padding) DCI format 0-1. If the size of DCI format 1-1 is smaller than the size of DCI format 0-1, the size of DCI format 0-1 may become the same as the size of DCI format 1-1 through truncation of some bits of DCI format 0-1.

If some bits of the larger DCI are truncated in [Methods 2, 3, and 3] of <Embodiment 3>, some bits may be truncated from the least significant bit (LSB) in all DCI bits, from bits of a specific field (for example, a resource allocation field on the frequency axis) within the DCI, or from bits in one or more fields within the DCI.

Through <Embodiment 3> of the disclosure, the reliability of the DCI format for transmission of first traffic can always be maintained by providing a higher priority to the DCI format for transmission of first traffic (a specific DCI format, for example, DCI format 0-2 or DCI format 1-2) than other DCI formats for other transmission (for example, transmission of second traffic), thus avoiding changing the size of the DCI format for transmission of first traffic, and moreover, the limit on the DCI size may be satisfied by arranging the size of DCI formats for transmission of second traffic (for example, DCI format 0-1 or DCI format 1-2).

Embodiment 4

In the 5G communication system, an activated bandwidth part of the terminal may be changed for various purposes (for example, a change in transmission subcarrier spacing, a reduction in power consumption of the terminal, or transmission of first traffic). The terminal may receive scheduling of a PDSCH in a specific bandwidth part and transmit HARQ-ACK corresponding thereto through a PUCCH. If the terminal acquires an indicator for changing an uplink bandwidth part and receives an indication of the bandwidth change at a time point between a time point at which DCI format 1-0 or 1-1 for scheduling the PDSCH is received and a time point at which HARQ-ACK for the corresponding PDSCH is transmitted through the PUCCH, the terminal may not transmit the corresponding HARQ-ACK. That is, before transmitting the HARQ-ACK for the PDSCH scheduled in the currently activated bandwidth part (referred to as bandwidth part #1), if the terminal acquires the bandwidth part change indicator and receives the indication for changing another bandwidth part (referred to as bandwidth part #2), which is not bandwidth #1, the terminal may change the bandwidth part to bandwidth part #2 and may not transmit HARQ-ACK for the PDSCH scheduled in bandwidth part #1.

In order to satisfy the high requirements of first traffic, that is, a very low delay time in 5G, it may be preferable not to change the bandwidth part until HARQ-ACK for the scheduled PDSCH is transmitted. Accordingly, in <Embodiment 4>, if the UE receives scheduling of first traffic, the following operation is performed.

For the PDSCH corresponding to first traffic, the terminal may not expect reception of an indicator for changing the uplink bandwidth at the time point between the time point at which DCI for scheduling the PDSCH is received and the time point at which HARQ-ACK for the corresponding PDSCH is transmitted through the PUCCH. That is, the terminal may not expect the change in the uplink bandwidth in which the PUCCH for reporting HARQ-ACK is transmitted before HARQ-ACK for the PDSCH corresponding to first traffic is transmitted. Accordingly, if the terminal receives DCI including the indicator for changing the uplink bandwidth at a time point between the time point at which DCI for scheduling the PDSCH for first traffic is received and the time point at which HARQ-ACK for the corresponding PDSCH is transmitted through the PUCCH, the terminal may determine that the corresponding DCI is erroneous and ignore the DCI.

For the PDSCH corresponding to first traffic, the terminal may not expect a difference between the bandwidth part in which the corresponding PDSCH is initially transmitted and the bandwidth part in which retransmission of the corresponding PDSCH is performed. That is, if the terminal receives the initially transmitted PDSCH for first traffic and fails to decode the same, the terminal may report NACK and make a request for retransmitting the PDSCH, in which case the retransmitted PDSCH may always be scheduled in the bandwidth part that is the same as the bandwidth part in which the initially transmitted PDSCH is scheduled. That is, the terminal may not expect a change in the downlink bandwidth part at the time point between the time point at which DCI for scheduling the PDSCH is received and the time point at which the retransmitted PDSCH corresponding to the PDSCH is received. If the terminal receives the PDSCH for first traffic and fails to decode the same and receives DCI including an indicator for changing a downlink bandwidth part at a time point between a time point at which the DCI for scheduling the initially transmitted PDSCH for first traffic is received and the time point at which the retransmitted PDSCH corresponding to the PDSCH is received, the terminal may determine the corresponding DCI to be an error and ignore the DCI.

For the PUSCH corresponding to first traffic, the terminal may not expect a difference between the bandwidth part in which the corresponding PUSCH is initially transmitted and the bandwidth part in which the corresponding PUSCH is retransmitted. That is, if the terminal can transmit the initially transmitted PUSCH for first traffic and the gNB fails to decode the corresponding PUSCH, the gNB may again transmit uplink grant DCI that makes a request for retransmission to the terminal. At this time, the indicator for changing the bandwidth part of the DCI for scheduling the retransmitted PUSCH cannot indicate a change to a bandwidth part different from the bandwidth part in which the initially transmitted PUSCH is scheduled. That is, the terminal may not expect a change in the uplink bandwidth part at a time point between the time point at which DCI for scheduling the PUSCH is received and the time point at which retransmission of the corresponding PUSCH is performed. If the terminal acquires the indicator for changing the bandwidth part before receiving the retransmitted DCI after the PUSCH for first traffic is transmitted, the terminal may implicitly determine that the PUSCH transmitted in the bandwidth part before the change is successfully transmitted to the gNB.

According to <Embodiment 4> of the disclosure, there is an advantage of minimizing a delay time by changing a bandwidth part until transmission of first traffic is completed.

Embodiment 4-1

<Embodiment 4-1> of the disclosure proposes a bandwidth part change operation of the terminal if a MAC CE activation command is received.

When the terminal receives a MAC CE activation command, the terminal may apply the activation command 3 ms after a slot for transmitting HARQ-ACK for the PDSCH providing the corresponding MAC CE. If the terminal acquires an indicator for changing the uplink bandwidth part before transmitting HARQ-ACK for the PDSCH providing the MAC CE activation command, the terminal may not transmit the corresponding HARQ-ACK. If the terminal succeeds in decoding the PDSCH providing the MAC CE activation command, whether or not to apply the corresponding to MAC CE activation command should be defined in detail.

Method 1

For the PDSCH providing the MAC CE activation command, the terminal may not expect reception of a bandwidth part change indicator for an uplink bandwidth at a time point between the time point at which DCI for scheduling the PDSCH is received and the time point at which HARQ-ACK for the corresponding PDSCH is transmitted through the PUCCH. If the terminal succeeds in decoding the PDSCH providing the MAC CE activation command and receives DCI including the indicator for changing the uplink bandwidth at a time point between the time point at which DCI for scheduling the corresponding PDSCH is received and the time point at which HARQ-ACK for the corresponding PDSCH is transmitted through the PUCCH, the terminal may determine that the corresponding DCI is erroneous and ignore the DCI. Further, if the terminal succeeds in decoding the PDSCH providing the MAC CE activation command, the terminal may apply the activation command after a specific time or a specific slot from the slot for transmitting HARQ-ACK for the PDSCH providing the corresponding MAC CE. For example, the terminal may apply the activation command 3 ms after the slot for transmitting HARQ-ACK for the PDSCH providing the corresponding MAC CE.

The gNB may not transmit the indicator for changing the uplink bandwidth before receiving HARQ-ACK for the corresponding PDSCH from the terminal after the PDSCH providing the MAC CE activation command is transmitted.

Method 2

For the PDSCH providing the MAC CE activation command, if the terminal receives a bandwidth part change indicator for an uplink bandwidth at a time point between the time point at which DCI for scheduling the corresponding PDSCH is received and the time point at which HARQ-ACK for the corresponding PDSCH is transmitted through the PUCCH, the terminal may not transmit the corresponding HARQ-ACK. If the terminal succeeds in decoding the PDSCH providing the MAC CE activation command, the terminal may apply the MAC CE activation command.

Method 3

For the PDSCH providing the MAC CE activation command, if the terminal receives a bandwidth part change indicator for an uplink bandwidth at a time point between the time point at which DCI for scheduling the corresponding PDSCH is received and the time point at which HARQ-ACK for the corresponding PDSCH is transmitted through the PUCCH, the terminal may not transmit the corresponding HARQ-ACK. The terminal may not apply the MAC CE activation command regardless of whether the PDSCH providing the MAC CE activation command is successfully decoded.

Method 4

For the PDSCH providing the MAC CE activation command, if the terminal receives a bandwidth part change indicator for an uplink bandwidth at a time point between the time point at which DCI for scheduling the corresponding PDSCH is received and the time point at which HARQ-ACK for the corresponding PDSCH is transmitted through the PUCCH, the terminal may transmit the corresponding HARQ-ACK in the changed bandwidth part.

Method 5

For the PDSCH providing the MAC CE activation command, the terminal may not expect reception of a bandwidth part change indicator for an uplink bandwidth through DCI corresponding to second traffic at a time point between the time point at which DCI for scheduling the PDSCH is received and the time point at which HARQ-ACK for the corresponding PDSCH is transmitted through the PUCCH.

If the terminal succeeds in decoding the PDSCH providing the MAC CE activation command and receives DCI corresponding to second traffic, including the indicator for changing the uplink bandwidth at a time point between the time point at which DCI for scheduling the corresponding PDSCH is received and the time point at which HARQ-ACK for the corresponding PDSCH is transmitted through the PUCCH, the terminal may determine that the corresponding DCI is erroneous and ignore the DCI. Further, if the terminal succeeds in decoding the PDSCH providing the MAC CE activation command, the terminal may apply the activation command 3 ms after the slot for transmitting HARQ-ACK for the PDSCH providing the corresponding MAC CE.

For the PDSCH providing the MAC CE activation command, if the terminal receives a bandwidth part change indicator for an uplink bandwidth through DCI corresponding to first traffic at a time point between the time point at which DCI for scheduling the corresponding PDSCH is received and the time point at which HARQ-ACK for the corresponding PDSCH is transmitted through the PUCCH, the terminal may not transmit the corresponding HARQ-ACK. If the terminal succeeds in decoding the PDSCH providing the MAC CE activation command, the terminal may apply the MAC CE activation command.

The gNB may not transmit the indicator for changing the uplink bandwidth through DCI corresponding to second traffic before receiving HARQ-ACK for the corresponding PDSCH from the terminal after the PDSCH providing the MAC CE activation command is transmitted.

Method 6

For the PDSCH providing the MAC CE activation command, the terminal may not expect reception of a bandwidth part change indicator for an uplink bandwidth through DCI corresponding to second traffic at a time point between the time point at which DCI for scheduling the PDSCH is received and the time point at which HARQ-ACK for the corresponding PDSCH is transmitted through the PUCCH. If the terminal succeeds in decoding the PDSCH providing the MAC CE activation command and receives DCI corresponding to second traffic, including the indicator for changing the uplink bandwidth at a time point between the time point at which DCI for scheduling the corresponding PDSCH is received and the time point at which HARQ-ACK for the corresponding PDSCH is transmitted through the PUCCH, the terminal may determine that the corresponding DCI is erroneous and ignore the DCI. Further, if the terminal succeeds in decoding the PDSCH providing the MAC CE activation command, the terminal may apply the activation command 3 ms after the slot for transmitting HARQ-ACK for the PDSCH providing the corresponding MAC CE.

For the PDSCH providing the MAC CE activation command, if the terminal receives a bandwidth part change indicator for an uplink bandwidth through DCI corresponding to first traffic at a time point between the time point at which DCI for scheduling the corresponding PDSCH is received and the time point at which HARQ-ACK for the corresponding PDSCH is transmitted through the PUCCH, the terminal may not transmit the corresponding HARQ-ACK. The terminal may not apply the MAC CE activation command regardless of whether the PDSCH providing the MAC CE activation command is successfully decoded.

The gNB may not transmit the indicator for changing the uplink bandwidth through DCI corresponding to second traffic before receiving HARQ-ACK for the corresponding PDSCH from the terminal after the PDSCH providing the MAC CE activation command is transmitted.

Embodiment 5

The terminal may receive a configuration of a control resource set from the gNB through higher-layer signaling (for example, MIB, SIB, or RRC). At this time, the configuration information in [Table 7] may be provided to the terminal by the gNB. The configuration information of tci-StatesPDCCH (simply referred to as a TCI state) in [Table 7] may include information on one or a plurality of SS/PBCH block indexes or CSI-RS indexes having the QCL relationship with a DMRS transmitted in a control resource set. For one control resource set, the terminal may receive a configuration of one or more TCI states from the gNB. If a plurality of TCI states is configured for the control resource set, the terminal may receive a message indicating activation of one TCI state among the plurality of TCI states from the gNB through a MAC CE activation command. If the terminal does not receive the MAC CE activation command, the terminal may receive a PDCCH in the corresponding control resource set on the basis of the assumption that the terminal has the QCL relationship with the SS/PBCH block, determined upon initial access. The TCI state may include the parameters in the following table.

TABLE 22

| | |
|---|---|
| TCI-State ::= | SEQUENCE { |
| tci-StateId | TCI-StateId, |
| (ID of TCI state) | |
| qcl-Type1 | QCL-Info, |
| (QCL type 1) | |
| qcl-Type2 | QCL-Info |
| (QCL type 2) | |
| } | |
| QCL-Info ::= | SEQUENCE { |
| cell | ServCellIndex |
| (ID of Serving cell) | |
| bwp-Id | BWP-Id |
| (ID of BWP) | |
| referenceSignal | CHOICE { |
| csi-rs | NZP-CSI-RS-ResourceId, |
| ssb | SSB-Index |
| }, | |

TABLE 22-continued

| qcl-Type (QCL type configuration) | ENUMERATED {typeA, typeB, typeC, typeD}, |
|---|---|
| ... | |
| } | |

In the above table, QCL types A, B, C, and D may be set as, for example, values corresponding to the following parameters.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The gNB may configure one or a plurality of control resource sets in the terminal, and respective control resource sets may be configured as different TCI states. That is, the terminal may assume the QCL relationship of the PDCCH DMRS on the basis of TCI state information configured to each control resource set and perform channel estimation on the basis thereof. If the terminal overlappingly monitors different control resource sets at a specific time point due to the search space configuration of the gNB, the terminal may be required to receive control information on the basis of the assumption of one TCI state among TCI states configured in the overlapping control resource set according to the circumstances (for example, if a TCI state is configured as a specific QCL type corresponding to at least one of the QCL types or is configured as a QCL type D). In this case, in order to monitor the PDCCH, the terminal needs a method of assuming a TCI state for a control resource set.

Figure 10:
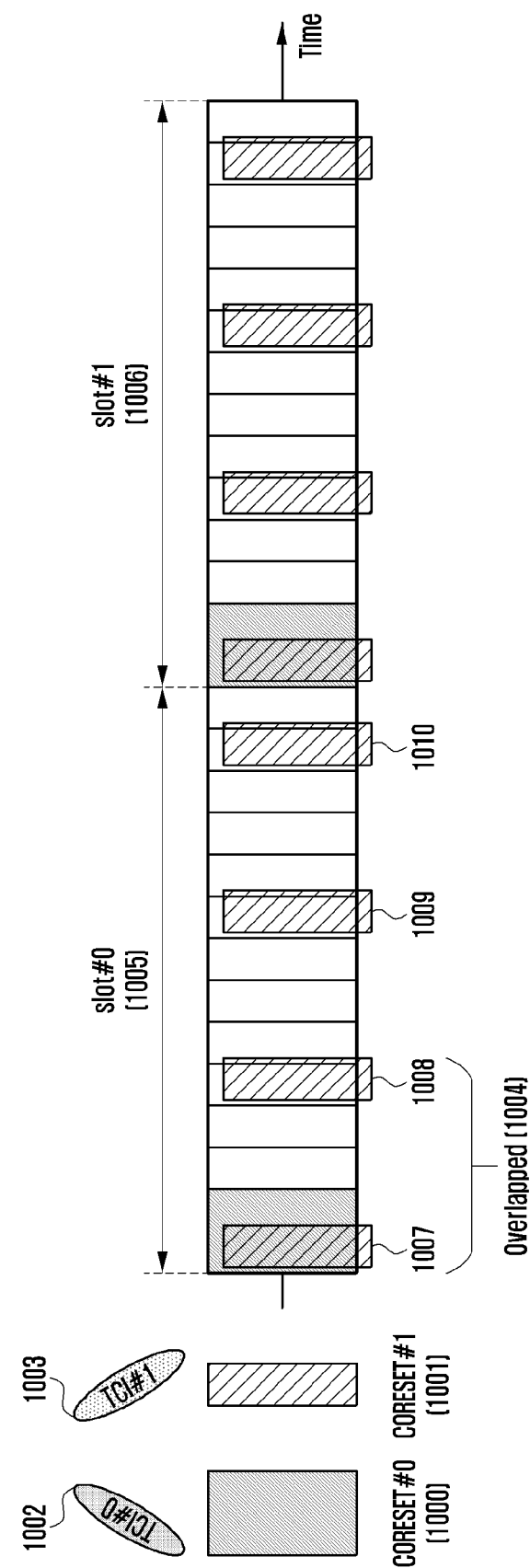
FIG. 10 illustrates an example of configuration for a control resource set, a search space, and a transmission configuration information (TCI) state considered in <Embodiment 5> of the disclosure.

FIG. 10 illustrates an example of a configuration for a control resource set, a search space, and a TCI state considered in <Embodiment 5> of the disclosure.

FIG. 10 illustrates an example in which control resource set #0 1000 and control resource set #1 1001 are configured in the TCI states TCI #0 1002 and TCI #1 1003, respectively. Control resource set #0 1000 and control resource set #1 1001 are configured as different search spaces, and thus may have different monitoring occasions. At this time, in the example of FIG. 10, a specific overlapping occasion (overlapped) 1004 exists between the monitoring occasions of control resource set #0 1000 and control resource set #1 1001. In FIG. 10, monitoring occasions of control resource set #0 1000 and control resource set #1 1001 overlap each other in their first symbols of slot #0 1005 and slot #1 1006. If TCI states of control resource set #0 1000 and control resource set #1 1001 satisfy a specific condition (for example, if the TCI states are configured in a specific QCL type or a QCL type D), the terminal may be required to receive control information on the basis of the assumption of one TCI state in the overlapping region 1004. Hereinafter, various embodiments in which the terminal determines a TCI state for monitoring each control resource set in the overlapping region 1004 are proposed.

Embodiment 5-1

For all control resource sets existing in the overlapping region, the terminal may assume a TCI state configured in a control resource set corresponding to a "first control resource set" among the overlapping control resource sets. Further, the terminal may equally apply the TCI state assumed in the overlapping region to all monitoring occasions within the slot.

The first control resource set may be, for example, a control resource set corresponding to one of the following control resource sets.
- The control resource set having the lowest (or highest) index
- A control resource set associated with a search space set configured as a common search space
- The control resource set having the lowest (or highest) index among control resource sets associated with a search space set configured as a common search space The description will be made in detail on the basis of the example illustrated in FIG. 10. If resource set #0 1000 corresponds to a first control resource set among control resource sets of the overlapping region 1004, the terminal may monitor control resource set #0 1000 and control resource set #1 1001 in the overlapping region on the basis of the assumption of TCI #0 1002 of control resource set #0 1000. At this time, the terminal may monitor all monitoring occasions within the slot of control resource set #1 1001, that is, occasions 1007, 1008, 1009, and 1010, on the basis of the assumption of TCI #0 1002.

Embodiment 5-2

For all control resource sets existing in the overlapping region, the terminal may assume a TCI state configured in a control resource set corresponding to a "first control resource set" among the overlapping control resource sets. Further, the terminal may apply the TCI state assumed in the overlapping region only to overlapping monitoring occasions within the slot, and the TCI states generally configured in the corresponding control resource set may be applied to non-overlapping regions.

The first control resource set may be, for example, a control resource set corresponding to one of the following control resource sets.
- The control resource set having the lowest (or highest) index
- A control resource set associated with a search space set configured as a common search space
- The control resource set having the lowest (or highest) index among control resource sets associated with a search space set configured as a common search space The description will be made in detail on the basis of the example illustrated in FIG. 10. If control resource set #0 1000 corresponds to a first control resource set, among control resource sets of the overlapping region 1004, the terminal may monitor control resource set #0 1000 and control resource set #1 1001 on the basis of the assumption of TCI #0 1002 of control resource set #0 1000, among the control resource sets of the overlapping region 1004. At this time, the terminal may monitor only a monitoring occasion corresponding to the overlapping region 1004, that is, the occasion 1007, among the monitoring occasions within the slot of control resource set #1 1001 on the basis of the assumption of TCI #0 1002, and may monitor other monitoring occasions, that is, occasions 1008, 1009, and 1010, on the basis of the assumption of TCI #1 1003.

Embodiment 5-2-1

If a control resource set that is not a first control resource set (corresponding to control resource set #1 1001 in FIG. 10) corresponds to a control resource set for monitoring DCI corresponding to first traffic, the terminal may operate according to <Embodiment 5-2>. If a control resource set which is not a first control resource set (that is, corresponding to control resource set #1 1001 in FIG. 10) does not correspond to a control resource set for monitoring DCI corresponding to first traffic, the terminal may operate according to <Embodiment 5-2>.

Embodiment 5-3

The terminal may monitor only a control resource set corresponding to a "first control resource set" among the control resource sets existing in the overlapping region among the monitoring occasions, and may not monitor other control resource sets.

The description will be made in detail on the basis of the example illustrated in FIG. 10. If control resource set #0 1000 of the control resource sets in the overlapping region 1004 corresponds to a first control resource set, the terminal may monitor control resource set #0 1000 on the basis of the assumption of TCI #0 1002 of control resource set #0 1000. Further, the terminal may not monitor the monitoring occasion 1007 of other control resource sets of the overlapping region, that is, control resource set #1 1001, and may monitor other monitoring occasions 1008, 1009, and 1010 which do not overlap.

Embodiment 5-3-1

If a control resource set which is not a first control resource set (corresponding to control resource set #1 1001 in FIG. 10) corresponds to a control resource set for monitoring DCI corresponding to first traffic, the terminal may operate according to <Embodiment 5-3>. For example, if the first traffic is traffic for URLCC, it is highly likely that a reliability problem may occur even though DCI is monitored for the first traffic in such a situation, and thus the control resource set that overlaps the first control resource set, among the control resource sets which are not the first control resource set, may not be monitored.

Embodiment 5-4

The terminal may determine the control resource set having the highest priority (for example, referred to as a "first control resource set") and the control resource set having the next highest priority (referred to as a "second control resource set") to determine a TCI state among control resource sets existing in the overlapping region and assume different TCI states depending on the type of DCI monitored in the first control resource set of the overlapping region.

Figure 11:
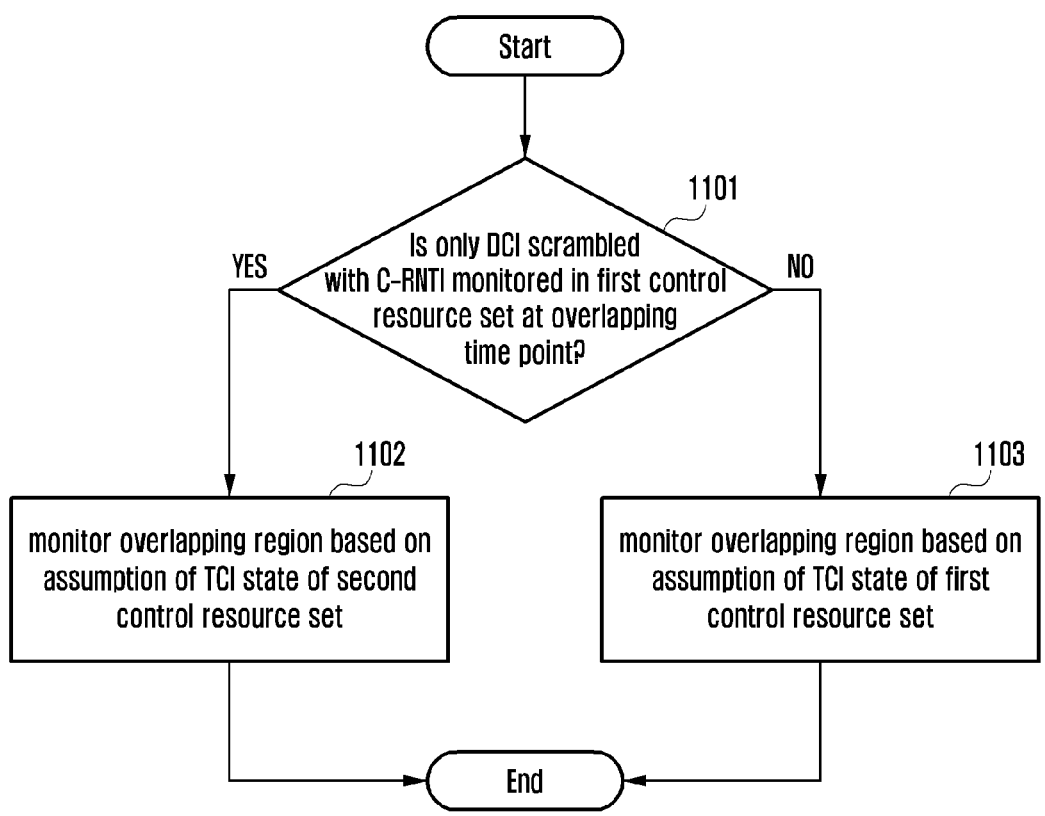
FIG. 11 illustrates <Embodiment 5-4> of the disclosure.

The first control resource set may be, for example, a control resource set corresponding to one of the following control resource sets.
- The control resource set having the lowest (or highest) index
- A control resource set associated with a search space set configured as a common search space
- The control resource set having the lowest (or highest) index among control resource sets associated with a search space set configured as a common search space The second control resource set may be, for example, a control resource set corresponding to one of the following control resource sets.
- The control resource set having a second lowest (or second highest) index
- A control resource set associated with a search space set configured as a UE-specific search space
- The control resource set having the lowest (or highest) index among control resource sets associated with a search space set configured as a UE-specific search space FIG. 11 illustrates embodiment 5-4 of the disclosure. The terminal may determine whether to monitor only DCI scrambled with a C-RNTI (CS-RNTI or MCS-C-RNTI) in the first control resource set at a time point at which monitoring occasions of control resource sets overlap each other in step 1101. That is, the terminal may determine whether to monitor only DCI (C-RNTI, CS-RNTI, and MCS-RNTI) for unicast without monitoring DCI (SI-RNTI, P-RNTI, RA-RNTI, SFI-RNTI, INT-RNTI, TPC-PUSCH-RNTI, TPC-PUCCH-RNTI, and TPC-SRS-RNTI) for broadcast in the first control resource set. If it is determined to monitor only the DCI scrambled with the C-RNTI in step 1101, the terminal may assume a TCI state configured in the second control resource set for all control resource sets existing in the overlapping region. If it is not determined to monitor only the DCI scrambled with the C-RNTI in step 1101, the terminal may assume a TCI state configured in the first control resource set for all control resource sets existing in the overlapping region.

In <Embodiment 5-4> of the disclosure, if DCI for broadcast is not transmitted in the control resource set having the highest priority (for example, the first control resource set), the terminal may provide a lower priority to the corresponding control resource set and assume a TCI state configured in the control resource set having the next highest priority (that is, the second control resource set). A detailed example thereof will be described. For the description, it is assumed that the first control resource set is a control resource set configured as a common search space and that the second control resource set is a control resource set configured as a UE-specific search space. In the common search space of the first control resource set, not only DCI for broadcast but also fallback DCI for unicast may be monitored. In general, a TCI state corresponding to a beam having a relatively large width may be configured for the control resource set configured as the common search space in order to transmit a plurality of broadcast DCIs to the terminal, and thus it may not be efficient for the control resource set configured as the common search space to transmit unicast DCI. On the other hand, a TCI state corresponding to a beam having a relatively small width toward the corresponding terminal may be configured in the UE-specific search space of the second control resource set in order to transmit unicast DCI to the terminal, so it may be efficient for the UE-specific search space of the second control resource set to transmit unicast DCI. Accordingly, only when only unicast DCI is monitored in the first control resource set at a specific time point at which the first control resource set and the second control resource set overlap, monitoring control resource sets existing in the overlapping region may be efficient for transmitting unicast DCI on the basis of the assumption of the TCI state of the second control resource set.

Embodiment 5-4-1

If the second control resource set (that is, corresponding to control resource set #1 1001 in FIG. 10) corresponds to a control resource set for monitoring DCI corresponding to first traffic, the terminal may operate according to <Embodiment 5-4>.

Embodiment 6

A slot format may include a downlink (DL) symbol, an uplink (UL) symbol, and a flexible symbol. The terminal may semi-statically receive notification of a configuration for a slot format from the gNB through higher-layer signaling (for example, SIB or RRC) (corresponding higher-layer parameters may be named tdd-UL-DL-ConfigurationCommon, tdd-UL-DL-ConfigurationCommon2, and tdd-UL-DL-ConfigDedicated).

The terminal may receive notification of various parameters (corresponding to the parameters shown in [Table 12] above, such as time resource allocation information, frequency resource allocation information, transmission period, the number of repetitions, and RV) for transmission with a configured grant through higher-layer signaling (for example, RRC), and the terminal receiving the configuration of transmission with the configured grant may transmit and receive data through the corresponding resources without any grant.

For a specific slot, if the terminal is configured to perform PUSCH transmission with a configured grant in a symbol configured in DL notified through higher-layer signaling (for example, RRC parameter, tdd-UL-DL-ConfigurationCommon, tdd-UL-DL-ConfigurationCommon2, and tdd-UL-DL-ConfigDedicated), the terminal may not perform PUSCH transmission with a configured grant in the corresponding slot.

For a specific slot, if the terminal is configured to perform PUSCH transmission with a configured grant in a symbol configured in UL made known through higher-layer signaling (for example, RRC parameter, tdd-UL-DL-ConfigurationCommon, tdd-UL-DL-ConfigurationCommon2, and tdd-UL-DL-ConfigDedicated), the terminal may not perform PDSCH reception with a configured grant in the corresponding slot.

This will be described in more detail with reference to the drawings.

Figure 12:
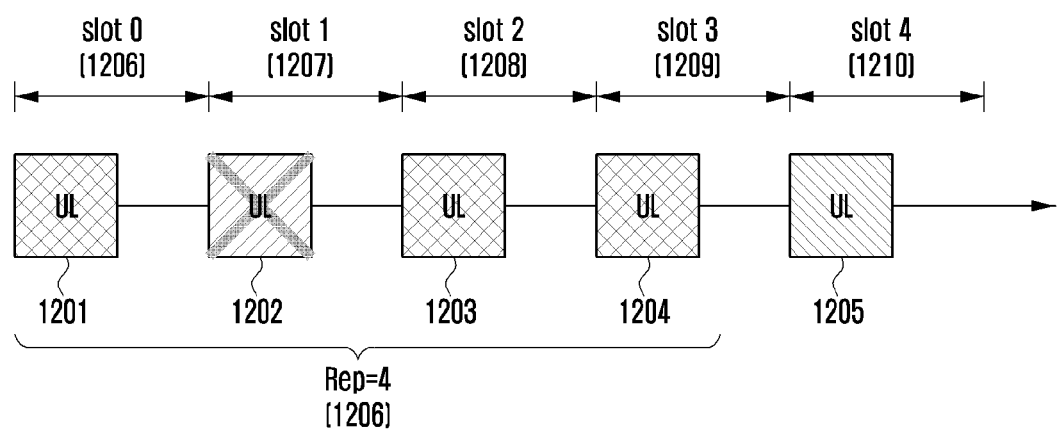
FIG. 12 illustrates an example of physical uplink shared channel (PUSCH) transmission with a configured grant according to an embodiment of the disclosure.

In FIG. 12, the terminal receives a configuration to perform PUSCH transmission with a configured grant. The number of repetitions is configured as four 1206. If the terminal starts PUSCH transmission with the configured grant in slot #0 1206, the terminal may perform transmission over slot #0 1206, slot #1 1207, slot #2 1208, and slot #3 1209 through four repetitive transmissions 1206. At this time, if the symbols for transmitting the PUSCH of slot #1 1207 correspond to symbols configured in DL notified through higher-layer signaling (for example, RRC parameter, tdd-UL-DL-ConfigurationCommon, tdd-UL-DL-ConfigurationCommon2, and tdd-UL-DL-ConfigDedicated), the terminal may perform only transmission 1201, 1203, and 1204 without performing PUSCH transmission 1202. However, if transmission in the example of FIG. 12 corresponds to PUSCH transmission corresponding to first traffic, the operation (that is, the case in which a preset number of repetitions 1206 is not achieved since transmission 1202 is not performed) may not satisfy requirements of high reliability.

Accordingly, <Embodiment 6> of the disclosure proposes a method of transmission and reception with a configured grant corresponding to first traffic having strict requirements.

For a specific slot, if the terminal is configured to perform PUSCH transmission with a configured grant in a symbol configured in DL notified through higher-layer signaling (for example, RRC parameter, tdd-UL-DL-ConfigurationCommon, tdd-UL-DL-ConfigurationCommon2, and tdd-UL-DL-ConfigDedicated), the terminal may not perform PUSCH transmission with a configured grant in the corresponding slot. However, if the PUSCH with the configured grant transmitted by the terminal corresponds to first traffic, the terminal may continuously perform PUSCH transmission with the configured grant until a preset maximum number of repetitions is achieved.

For a specific slot, if the terminal is configured to perform PUSCH transmission with a configured grant in a symbol configured in DL made known through higher-layer signaling (for example, RRC parameter, tdd-UL-DL-ConfigurationCommon, tdd-UL-DL-ConfigurationCommon2, and tdd-UL-DL-ConfigDedicated), the terminal may not perform PUSCH transmission with a configured grant in the corresponding slot. However, if the PUSCH with the configured grant transmitted by the terminal corresponds to first traffic, the terminal may perform PUSCH transmission with the configured grant until a preset maximum number of repetitions is achieved.

In a detailed description made with reference to FIG. 12, if symbols 1202 for transmitting the PUSCH of slot #1 1207 correspond to symbols configured in DL made known through higher-layer signaling (for example, RRC parameter, tdd-UL-DL-ConfigurationCommon, tdd-UL-DL-ConfigurationCommon2, and tdd-UL-DL-ConfigDedicated), the terminal may perform only transmission 1201, 1203, and 1204 without performing PUSCH transmission 1202. If the PUSCH with the configured grant transmitted by the terminal corresponds to first traffic, the terminal may additionally transmit the PUSCH 1205 in slot #4 1210 in order to meet a preset maximum number of repetitions 1206.

Figure 13:
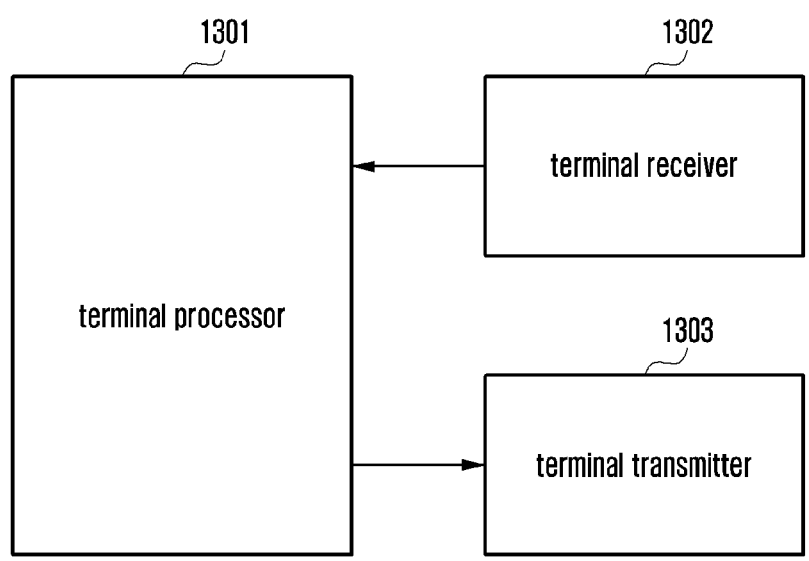
FIG. 13 illustrates a block diagram of the internal structure of the terminal according to an embodiment of the disclosure.
Figure 14:
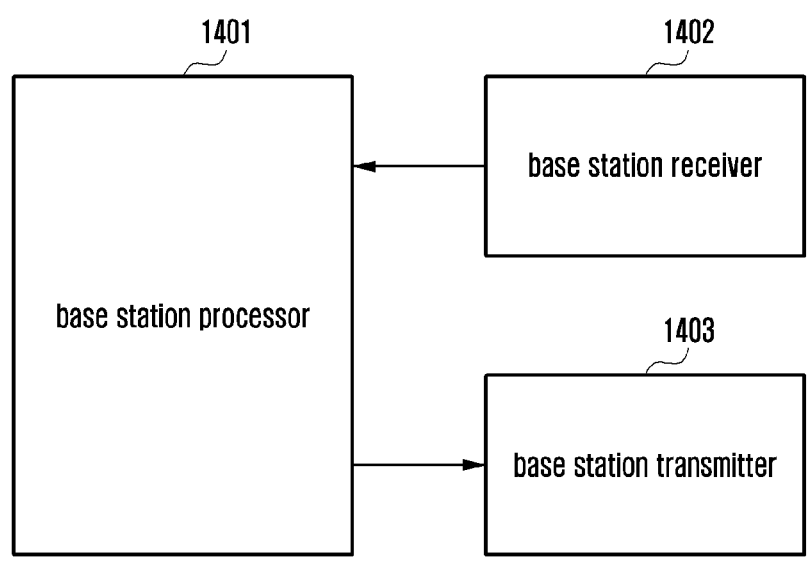
FIG. 14 illustrates a block diagram of the internal structure of a base station according to an embodiment of the disclosure.

Transmitters, receivers, and controllers of the terminal and the base station (ex, gNB) are illustrated in FIGS. 13 and 14, respectively, to implement the embodiments of the disclosure. In the 5G system corresponding to the embodiment, a transmission/reception method of the base station and the terminal for applying a method of transmitting and receiving a downlink control channel and downlink control information is described, and the transmitters, receivers, and processors of the base station and the terminal should operate according to each embodiment in order to perform the method.

Specifically, FIG. 13 is a block diagram illustrating the internal structure of a terminal according to an embodiment of the disclosure.

As illustrated in FIG. 13, the terminal according to the disclosure may include a terminal processor 1301, a receiver 1302, and a transmitter 1303.

The terminal processor 1301 may control a series of processes according to which the terminal may operate according to the above-described embodiments of the disclosure. The terminal processor 1301 may be defined as a processing unit, a processor, or a controller. Further, the terminal processor 1301 may include at least one processor. For example, a maximum number of PDCCH candidates, a method of calculating the limit on a maximum number of CCEs, and an operation for monitoring a PDCCH by the terminal according to an embodiment of the disclosure may be differently controlled. Further, the terminal processor 1301 may control the terminal operation according to various embodiments and various methods of the disclosure.

For example, the terminal processor 1301 according to an embodiment of the disclosure may perform control to receive a control message including configuration information of a first CORESET (control resource set) and configuration information of a second CORESET, determine whether a first monitoring occasion of the first CORESET and a second monitoring occasion of the second CORESET overlap, and if the first monitoring occasion and the second monitoring occasion overlap, monitor a physical downlink control channel (PDCCH) in the CORESET corresponding to a first control resource set among the first CORESET and the second CORESET. The first control resource set may correspond to the CORESET having the lowest index among CORESETs related to a command search space (CSS) set. Quasi co-location (QCL) types of the first CORESET and the second CORESET may be a QCL type D. The terminal processor 1301 may assume a transmission configuration information (TCI) state related to the CORESET corresponding to the first control resource set, and may perform control to monitor the PDCCH. If a symbol corresponding to the first monitoring occasion is the same as at least one symbol corresponding to the second monitoring occasion, the terminal processor 1301 may determine that the first monitoring occasion overlaps the second monitoring occasion. The terminal processor 1301 may perform control to receive search space configuration information and determine the CORESET corresponding to the first control resource set on the basis of a CORESET index, a search space type, monitoring occasion information, and radio network temporary identifier (RNTI) information included in the search space configuration information. If to the terminal monitors only DCI for unicast transmission in the CORESET corresponding to the first control resource set, the terminal processor 1301 may perform control to monitor the PDCCH in a CORESET corresponding to a second control resource set. The second control resource set may correspond to a CORESET having the lowest index among CORESETs related to a UE-specific search space (USS). Also, the second control resource set may correspond to a CORESET for monitoring DCI of URLLC.

The terminal receiver 1302 and the terminal transmitter 1303 are commonly called a transceiver in the embodiments of the disclosure. The transceiver may transmit and receive a signal to and from the base station. The signal may include control information and data. To this end, the transceiver may include an RF transmitter that up-converts and amplifies the frequency of a transmitted signal, an RF receiver that low-noise amplifies a received signal and down-converts the frequency, and the like. Further, the transceiver may receive a signal through a wireless channel, output the signal to the terminal processor 1301, and transmit the signal output from the terminal processor 1301 through a wireless channel.

FIG. 14 is a block diagram illustrating the internal structure of the base station according to an embodiment of the disclosure.

As illustrated in FIG. 14, the base station according to the disclosure may include a base station processor 1401, a receiver 1402, and a transmitter 1403.

The base station processor 1401 may control a series of processes such that the base station operates according to the above-described embodiments of the disclosure. The base station processor 1401 may be defined as a processing unit, a processor, or a controller. Further, the base station processor 1401 may include at least one processor. For example, a maximum number of PDCCH candidates, a method of calculating the limit on the maximum number of CCEs, and an operation for configuring a control resource set and a search space by the base station according to an embodiment of the disclosure may be differently controlled. Further, the base station processor 1401 may control the base station operation according to various embodiments and various methods of the disclosure.

For example, the base station processor 1401 may perform control to transmit a control message including configuration information of a first CORESET (control resource set) and configuration information of a second CORESET and transmit search space configuration information including a CORESET index, a search space type, and radio network temporary identifier (RNTI) information. If a first monitoring occasion of the first CORESET overlaps a second monitoring occasion of the second CORESET, a physical downlink control channel (PDCCH) may be monitored in a CORESET corresponding to a first control resource among the first CORESET and the second CORESET. The first control resource set may correspond to the CORESET having the lowest index among CORESETs related to a command search space (CSS) set, and quasi co-location (QCL) types of the first CORESET and the second CORESET may be a QCL type D.

The base station receiver 1402 and the base station transmitter 1403 in the embodiments of the disclosure may be commonly referred to as a transceiver. The transceiver may transmit and receive a signal to and from the terminal. The signal may include control information and data. To this end, the transceiver may include an RF transmitter that up-converts and amplifies the frequency of a transmitted signal, an RF receiver that low-noise amplifies a received signal and down-converts the frequency, and the like. Further, the transceiver may receive a signal through a wireless channel, output the signal to the base station processor 1401, and transmit the signal output from the base station processor 1401 through a wireless channel.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, information indicating to monitor a downlink control information (DCI) format 0_2 and a DCI format 1_2;
   determining whether conditions for a DCI size alignment are fulfilled based on a size of the DCI format 0_2 and a size of the DCI format 1_2; and
   in response to a determination that at least one of the conditions for the DCI size alignment is not fulfilled, padding zeros to a DCI format 0_1 or a DCI format 1_1 until a size of the DCI format 0_1 equals a size of the DCI format 1_1,
   wherein the conditions include:
     a total number of different DCI sizes configured to monitor is no more than a first value, and
     a total number of different DCI sizes with cell-radio network temporary identifier (C-RNTI) configured to monitor is no more than a second value.

2. The method of claim 1,
   wherein, in response to a determination that the size of the DCI format 0_1 is less than the size of the DCI format 1_1, zeros are padded to the DCI format 0_1 until the size of the DCI format 0_1 equals the size of the DCI format 1_1, and wherein, in response to a determination that the size of the DCI format 1_1 is less than the size of the DCI format 0_1, zeros are padded to the DCI format 1_1 until the size of the DCI format 1_1 equals the size of the DCI format 0_1.

3. The method of claim 1, further comprising monitoring the DCI format 0_1 and the DCI format 1_1 based on an assumption that the size of the DCI format 0_1 equals the size of the DCI format 1_1, in response to a determination that at least one of the conditions for the DCI size alignment is not fulfilled.

4. The method of claim 1, further comprising, in response to a determination that the conditions for the DCI size alignment are fulfilled, monitoring configured DCI formats without performing a DCI format size alignment procedure additionally.

5. A method performed by a base station in a wireless communication system, the method comprising:
 transmitting, to a terminal, information indicating to monitor a downlink control information (DCI) format 0_2 and a DCI format 1_2; and
 transmitting, to the terminal, DCI formats based on the information indicating to monitor the DCI format 0_2 and the DCI format 1_2,
 wherein, in response to a determination that at least one of conditions for a DCI size alignment is not fulfilled based on a size of the DCI format 0_2 and a size of the DCI format 1_2, zeros are padded to a DCI format 0_1 or a DCI format 1_1 until a size of the DCI format 0_1 equals a size of the DCI format 1_1, and
 wherein the conditions include:
  a total number of different DCI sizes configured to monitor is no more than a first value, and
  a total number of different DCI sizes with cell-radio network temporary identifier (C-RNTI) configured to monitor is no more than a second value.

6. The method of claim 5,
 wherein, in response to a determination that the size of the DCI format 0_1 is less than the size of the DCI format 1_1, zeros are padded to the DCI format 0_1 until the size of the DCI format 0_1 equals the size of the DCI format 1_1, and
 wherein, in response to a determination that the size of the DCI format 1_1 is less than the size of the DCI format 0_1, zeros are padded to the DCI format 1_1 until the size of the DCI format 1_1 equals the size of the DCI format 0_1.

7. The method of claim 5, wherein the DCI format 0_1 and the DCI format 1_1 are monitored by the terminal based on an assumption that the size of the DCI format 0_1 equals the size of the DCI format 1_1, in response to a determination that at least one of the conditions for the DCI size alignment is not fulfilled.

8. The method of claim 5, wherein, in response to a determination that the conditions for the DCI size alignment are fulfilled, DCI formats configured for the terminal are monitored without performing a DCI format size alignment procedure additionally.

9. A terminal in a wireless communication system, the terminal comprising:
 a transceiver; and
 a controller configured to:
  receive, from a base station, information indicating to monitor a downlink control information (DCI) format 0_2 and a DCI format 1_2,
  determine whether conditions for a DCI size alignment are fulfilled based on a size of the DCI format 0_2 and a size of the DCI format 1_2, and
  in response to a determination that at least one of the conditions for the DCI size alignment is not fulfilled, pad zeros to a DCI format 0_1 or a DCI format 1_1 until a size of the DCI format 0_1 equals a size of the DCI format 1_1,
 wherein the conditions include:
  a total number of different DCI sizes configured to monitor is no more than a first value, and
  a total number of different DCI sizes with cell-radio network temporary identifier (C-RNTI) configured to monitor is no more than a second value.

10. The terminal of claim 9,
 wherein, in response to a determination that the size of the DCI format 0_1 is less than the size of the DCI format 1_1, zeros are padded to the DCI format 0_1 until the size of the DCI format 0_1 equals the size of the DCI format 1_1, and
 wherein, in response to a determination that the size of the DCI format 1_1 is less than the size of the DCI format 0_1, zeros are padded to the DCI format 1_1 until the size of the DCI format 1_1 equals the size of the DCI format 0_1.

11. The terminal of claim 9, wherein the controller is further configured to monitor the DCI format 0_1 and the DCI format 1_1 based on an assumption that the size of the DCI format 0_1 equals the size of the DCI format 1_1, in response to a determination that at least one of the conditions for the DCI size alignment is not fulfilled.

12. The terminal of claim 9, wherein, in response to a determination that the conditions for the DCI size alignment are fulfilled, the controller is further configured to monitor configured DCI formats without performing a DCI format size alignment procedure additionally.

13. A base station in a wireless communication system, the base station comprising:
 a transceiver; and
 a controller configured to:
  transmit, to a terminal, information indicating to monitor a downlink control information (DCI) format 0_2 and a DCI format 1_2, and
  transmit, to the terminal, DCI formats based on the information indicating to monitor the DCI format 0_2 and the DCI format 1_2,
 wherein, in response to a determination that at least one of conditions for a DCI size alignment is not fulfilled based on a size of the DCI format 0_2 and a size of the DCI format 1_2, zeros are padded to a DCI format 0_1 or a DCI format 1_1 until a size of the DCI format 0_1 equals a size of the DCI format 1_1, and
 wherein the conditions include:
  a total number of different DCI sizes configured to monitor is no more than a first value, and
  a total number of different DCI sizes with cell-radio network temporary identifier (C-RNTI) configured to monitor is no more than a second value.

14. The base station of claim 13,
 wherein, in response to a determination that the size of the DCI format 0_1 is less than the size of the DCI format 1_1, zeros are padded to the DCI format 0_1 until the size of the DCI format 0_1 equals the size of the DCI format 1_1, and
 wherein, in response to a determination that the size of the DCI format 1_1 is less than the size of the DCI format 0_1, zeros are padded to the DCI format 1_1 until the size of the DCI format 1_1 equals the size of the DCI format 0_1.

15. The base station of claim 13, wherein the DCI format 0_1 and the DCI format 1_1 are monitored by the terminal based on an assumption that the size of the DCI format 0_1 equals the size of the DCI format 1_1, in response to a determination that at least one of the conditions for the DCI size alignment is not fulfilled.

16. The base station of claim 13, wherein, in response to a determination that the conditions for the DCI size alignment are fulfilled, DCI formats configured for the terminal are monitored without performing a DCI format size alignment procedure additionally.

* * * * *